US012128887B1

(12) United States Patent
Kiiski

(10) Patent No.: US 12,128,887 B1
(45) Date of Patent: Oct. 29, 2024

(54) DYNAMIC OBJECT RELEVANCE DETERMINATION

(71) Applicant: Zoox, Inc., Foster City, CA (US)

(72) Inventor: Joona Markus Petteri Kiiski, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 377 days.

(21) Appl. No.: 16/389,720

(22) Filed: Apr. 19, 2019

(51) Int. Cl.
| | |
|---|---|
| *B60W 30/095* | (2012.01) |
| *B60W 30/09* | (2012.01) |
| *G06V 20/58* | (2022.01) |
| *G08G 1/16* | (2006.01) |

(52) U.S. Cl.
CPC ........ *B60W 30/0956* (2013.01); *B60W 30/09* (2013.01); *G06V 20/58* (2022.01); *G08G 1/166* (2013.01); *B60W 2554/4041* (2020.02); *B60W 2554/801* (2020.02)

(58) Field of Classification Search
CPC ............. B60W 30/0956; B60W 30/09; B60W 2554/4041; B60W 2554/801; G06K 9/00805; G08G 1/166
See application file for complete search history.

(56) References Cited

U.S. PATENT DOCUMENTS

| | | | |
|---|---|---|---|
| 10,730,531 B1 * | 8/2020 | Phillips ............. | B60W 60/0015 |
| 2009/0024357 A1 * | 1/2009 | Aso ........................ | G08G 1/164 |
| | | | 702/181 |
| 2012/0078498 A1 * | 3/2012 | Iwasaki ................. | B60W 10/20 |
| | | | 701/300 |
| 2018/0099665 A1 * | 4/2018 | You .................... | B60W 30/0953 |
| 2018/0267558 A1 * | 9/2018 | Tiwari ................ | G05D 1/0246 |
| 2019/0039610 A1 * | 2/2019 | Mukai .................... | G08G 1/166 |
| 2019/0293435 A1 * | 9/2019 | Mori ..................... | G08G 1/167 |
| 2019/0367021 A1 * | 12/2019 | Zhao .................. | B60W 60/0011 |
| 2020/0139963 A1 * | 5/2020 | Kim .................... | B60W 30/085 |
| 2020/0202488 A1 * | 6/2020 | Kawaguchi ............... | G06T 3/20 |
| 2022/0004775 A1 * | 1/2022 | Flick ......................... | G06T 7/80 |

\* cited by examiner

*Primary Examiner* — Jelani A Smith
*Assistant Examiner* — Toya Pettiegrew
(74) *Attorney, Agent, or Firm* — Lee & Hayes, P.C.

(57) ABSTRACT

A vehicle computing system may implement techniques to determine relevance of objects detected in an environment to a vehicle operating in the environment. The techniques may include determining locations and trajectories associated with a detected object and generating simulations of movement (e.g., estimated states) of the detected object and the vehicle over a period of time. The vehicle computing system may compare locations, distances, and/or trajectories of the detected object and the vehicle in an estimated state to determine whether the detected object is relevant to the vehicle performing the action (e.g., impacts the vehicle's ability to safely perform the action). The relevance determination may be based in part on a semantic classification of the detected object. Based on a determination that the detected object is irrelevant to the vehicle in an estimated state, the vehicle computing device may disregard the detected object in future estimated states and/or future vehicle control planning considerations.

20 Claims, 7 Drawing Sheets

DYNAMIC OBJECT RELEVANCE DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. The planning systems may perform a series of simulations to determine an effect of each detected object on a potential action for the vehicle. However, in environments with a large number of objects, performing simulations on each detected object may be computationally costly and, in some cases, impossible with onboard computing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
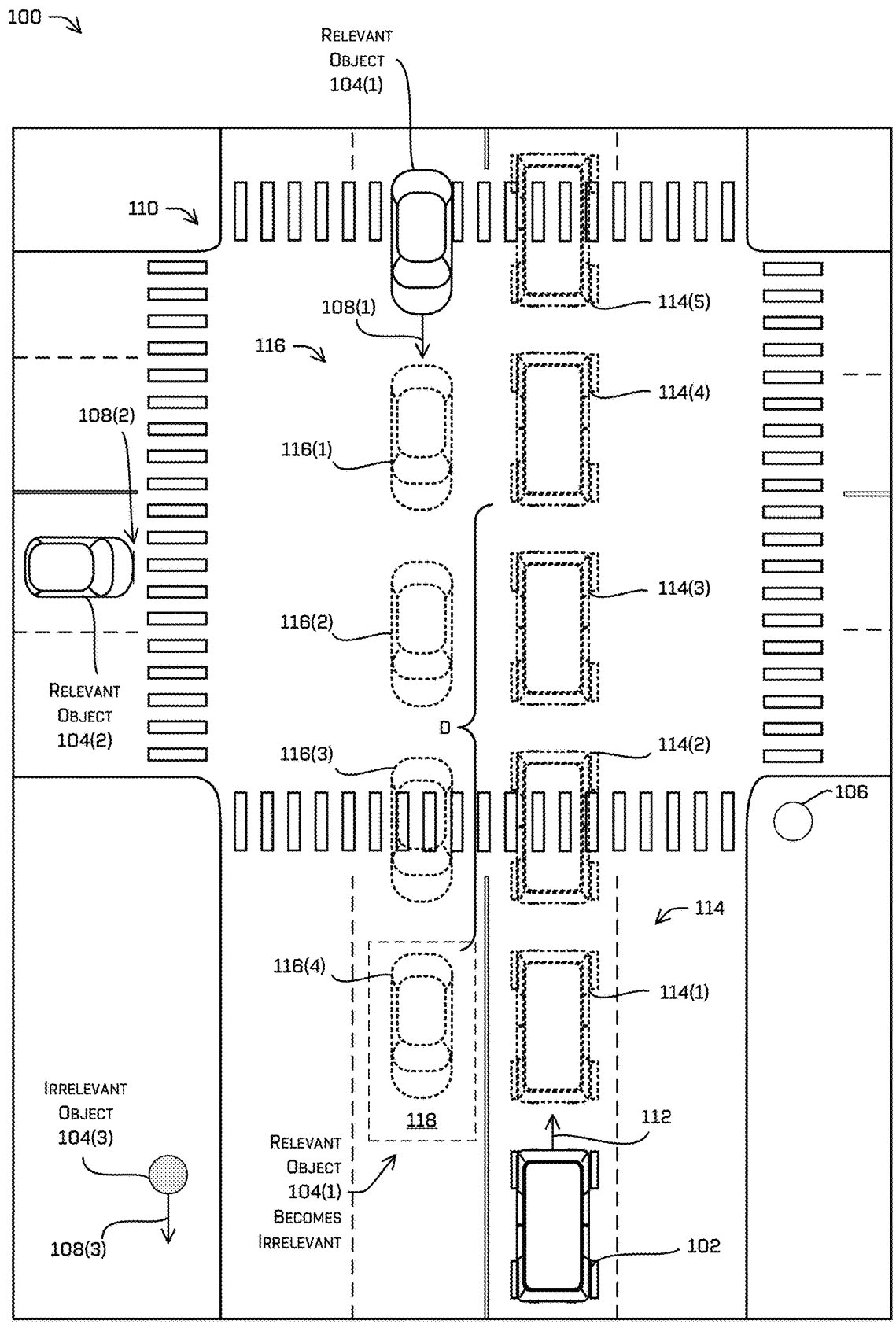
FIG. 1 is an illustration of an autonomous vehicle in an environment, in which an example dynamic object relevance system may determine whether objects in the environment may be relevant to the vehicle based in part on a vehicle action.

This disclosure is directed to techniques for dynamically determining relevance of objects to a vehicle in an environment. Objects determined not to be relevant to a potential action of the vehicle may be omitted or excluded from future computations (simulations, estimated states, interaction modeling, collision estimation, etc.) to reduce computational load during vehicle planning. An object may be relevant to the vehicle if the object and the vehicle could potentially occupy the same space or come within a threshold distance of one another over a period of time (e.g., potential for an accident). A determination of relevance may be based on a location of an object relative to the vehicle, a trajectory of the object (e.g., direct, speed, acceleration, etc.), a type of object (e.g., car, truck, motorcycle, pedestrian, etc.), or the like. For example, at a first time, a truck may be located in front of a vehicle on a road traveling in an opposite direction and may be determined to be relevant to the vehicle. Accordingly, the truck may be taken into account in a simulation or other vehicle control planning operation at the first time. At a second time, the truck may be a distance behind the vehicle and may therefore be determined to no longer be relevant to the vehicle. Based on a determination that an object is irrelevant to the vehicle, the object may be disregarded in future simulations (e.g., estimated states of the vehicle and/or object) and/or other vehicle control planning considerations. For the purposes of this discussion, a simulation and/or an estimated state may include predicted locations of a vehicle and one or more objects at a particular time in the future (e.g., time after a current/initial time).

The vehicle may include an autonomous or semi-autonomous vehicle with a vehicle computing system configured to detect one or more objects in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. The techniques described herein apply to detecting the relevance of dynamic objects and, unless indicated to the contrary, the term "object" herein refers to a dynamic object. In some examples, the objects may be detected based on sensor data from sensors (e.g., cameras, motion detectors, light detection and ranging (lidar), radio detection and ranging (radar), etc.) of the vehicle. In some examples, the objects may be detected based on sensor data received from remote sensors, such as, for example, sensors associated with another vehicle or sensors mounted in the environment that are configured to share data with a plurality of vehicles. In some examples, the vehicle computing system may be configured to semantically classify the detected objects. A classification may include another vehicle (e.g., car, a pick-up truck, a semi-trailer truck, a tractor, a bus, a train, etc.), a pedestrian, a bicyclist, an equestrian, or the like. For example, the vehicle computing system may detect two objects and classify a first object as a pedestrian and a second object as a pick-up truck.

The vehicle computing system may be configured to determine an initial position of each detected object. In various examples, the vehicle computing system may determine one or more predicted trajectories associated with each detected object, such as from an initial position associated therewith. In some examples, the one or more predicted trajectories may be determined based on the sensor data. Each predicted trajectory may represent a potential path that the detected object may travel through the environment. The one or more predicted trajectories may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof. In some examples, the one or more predicted trajectories may be determined based on an assumption that the vehicle will maintain a substantially constant velocity and/or direction of travel. In such examples, the one or more predicted trajectories may be based on an initial velocity and/or direction of travel determined based on the sensor data. In some examples, the one or more predicted trajectories may be determined using a probabilistic heat map to predict object behavior, such as that described in U.S. patent application Ser. No. 15/807,521, filed Nov. 8, 2017, the contents of which are incorporated herein by reference. In some examples, the one or more predicted trajectories may be determined utilizing machine learning techniques.

In various examples, the vehicle computing system may determine an initial relevance of each detected object to the vehicle. The initial relevance may be based on a determination that the detected object may occupy the same space as the vehicle over a pre-determined period of time (e.g., time period) in the future (e.g., 4 seconds, 8 seconds, 10 seconds, 1 minute, etc.). In at least one example, the pre-determined period of time may be 8 seconds. The initial relevance may be based on geometric data (e.g., distance, angle, direction of travel, velocity, acceleration, trajectory, etc.), semantic data (e.g., type, class, etc. associated with the object, defined location of the object (e.g., on road, off road, on sidewalk, etc.)), or a combination thereof.

In various examples, the vehicle computing system may utilize machine learning techniques to determine an initial relevance of a detected object. In such examples, machine learned models may be trained to determine, based on geometric.) and/or semantic data, that an object is or is irrelevant to a vehicle. In some examples, the vehicle computing system may apply a set of rules to each detected object to determine an initial relevance associated therewith. In various examples, the set of rules may be determined using machine learning techniques. The set of rules may be based on a distance, position, velocity, acceleration, and/or direction of travel of the object relative to the vehicle (e.g., trajectory), environmental factors (e.g., in proximity to an intersection, a crosswalk, etc.), weather factors (e.g., detected rain, snow, ice, etc.), timing factors (e.g., a time of day, day of the year, etc.), or the like. In some examples, a set of rules applied to a detected object may be based on a classification associated with the detected object. In such examples, the vehicle computing system may apply a first set of rules to pedestrians, a second set of rules to other vehicles, a third set of rules to motorcycles, and so on. For example, at time T=0, the vehicle computing system may detect two objects in the environment. The vehicle computing system may classify the first object as a truck and the second object as a pedestrian. The vehicle computing system may determine that the truck is located in front of the vehicle within a first threshold distance and is traveling in a direction opposite to the vehicle. The vehicle computing system may determine, based on the classification as a truck, the location, the distance, and/or the direction of travel, that the truck is a relevant object to the vehicle. Additionally, the vehicle computing system may determine that the pedestrian is located substantially abeam the vehicle and more than a second threshold distance away and not in proximity to a crosswalk (e.g., not within 10 feet, 15 meters, etc.). Based on the location, distance, and the lack of proximity to a crosswalk, the vehicle computing system may determine that the pedestrian is not a relevant object. Accordingly, the vehicle computing system may consider the truck and disregard the pedestrian in simulations and/or other vehicle control planning considerations.

In at least some examples, the system may continuously make such determinations at additional simulated time steps. In such examples, a set of future state of the environment may be predicted and, at each state a determination may be made whether or not to include one or more of the entities in subsequent time steps. In at least some such examples, such decisions may be made in accordance with similar techniques as defined above.

In various examples, the vehicle computing system may be configured to determine actions to take while operating (e.g., control planning) based on the relevant objects. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

In various examples, the vehicle computing system may be configured to determine reference actions and/or sub-actions that are applicable to the vehicle in the environment. For example, lane changes may not be applicable reference actions for a vehicle operating on a single-lane road. For another example, accelerating may not be an applicable sub-action for a vehicle operating at a speed limit.

For each applicable action and sub-action, the vehicle computing system may simulate future states (e.g., estimated states) by projecting the vehicle and relevant object(s) forward in the environment for the period of time (e.g., 5 seconds, 8 seconds, 12 seconds, etc.). The vehicle computing system may project the relevant object(s) (e.g., estimate future positions of the object(s)) forward based on a predicted trajectory associated therewith. The vehicle computing system may project the vehicle (e.g., estimate future positions of the vehicle) forward based on a vehicle trajectory associated with an action. The estimated state(s) may represent an estimated position (e.g., estimated location) of the vehicle and an estimated position of the relevant object(s) at a time in the future. In some examples, the vehicle computing system may determine relative data between the vehicle and the relevant object(s) in the estimated state(s). In such examples, the relative data may include distances, locations, speeds, directions of travel, and/or other factors between the vehicle and the object. In various examples, the vehicle computing system may determine estimated states at a pre-determined rate (e.g., 10 Hertz, 20 Hertz, 50 Hertz, etc.) throughout a set of estimated states (e.g., group of estimated states representing the estimated positions of the vehicle and/or object throughout the period of time). In at least one example, the estimated states may be performed at a rate of 10 Hertz (e.g., 80 estimated states over an 8 second period of time). In some examples, the vehicle computing device may determine estimated states of the vehicle and the object at various time intervals substantially in parallel. In such examples, the vehicle computing device may decrease a time required to generate a set of estimated states over the period of time.

During the set of estimated states, the vehicle computing system may perform one or more relevance verifications for the relevant object(s) during the set of estimated states. The relevance verification(s) may include a determination of whether a relevant object will be relevant to the vehicle at a time in the future (e.g., in a simulation and/or estimated state). The vehicle computing system may perform a relevance verification utilizing estimated positions and/or associated dynamics of the vehicle and the relevant object at the time. The vehicle computing system may perform the relevance verification substantially concurrently with an estimated state of the set of estimated states. The vehicle computing device may perform relevance verifications with each of the estimated states or less than all of the estimated states. For example, the vehicle computing device may perform relevance verifications on a subset of estimated states. In some examples, the vehicle computing device may perform relevance verifications periodically (e.g., every 10th estimated state, every 20th estimated state, every 4 seconds, etc.). In some examples, the vehicle computing device may perform relevance verifications randomly. In such examples, a determination to perform one or more relevance verifications may be dynamically determined, such as based on a number of objects detected in the environment). The relevance verification(s) may be based on geometric data, semantic data, or a combination thereof. In various examples, the vehicle computing system may evaluate a location and/or a trajectory of the vehicle compared to a location and/or a predicted trajectory of a relevant object of the one or more relevant objects in an estimated state to determine if the relevant object will remain relevant to the vehicle. In some examples, the vehicle computing system may utilize machine learning techniques to verify the relevance of a previously determined relevant object.

In some examples, the vehicle computing system may apply a set of rules based on the geometric data and/or the semantic data to determine if the relevant object will remain relevant to the vehicle. The set of rules may include relative distances (e.g., threshold distance from vehicle), relative locations (e.g., in front, behind, etc.), speeds, and/or directions of travel between the vehicle and the relevant object. In some examples, the set of rules may be based on a classification associated with the relevant object. For example, a vehicle computing system may detect an object and classify the object as a pedestrian at a time T=0. The vehicle computing system may determine that, at least because the pedestrian is located in front of a path of the vehicle, that the pedestrian is a relevant object. The vehicle computing system may include the pedestrian in estimated states of a set of estimated states of the vehicle forward in the environment for the period of time. Within a estimated state at time t+4 seconds, the vehicle computing system may perform a relevance verification corresponding to the pedestrian. The vehicle computing system may determine that the pedestrian, at time t+4, is located a threshold distance away from the vehicle and at a location substantially abeam the vehicle. Based in part on the distance and location relative to the vehicle, the vehicle computing system may determine that the pedestrian is no longer relevant to the vehicle. Based on a determination of irrelevance, the vehicle computing system may remove the pedestrian from future estimated states in the set of estimated states.

The set of rules may be the same or different from the set of rules utilized to determine initial relevance of detected objects. In some examples, the vehicle computing system may apply a first set of rules to relevant object(s) in a first estimated state and a second set of rules to the relevant object(s) in a second estimated state. In such examples, values associated with the distances, locations, and/or trajectories may differ from the first set of rules to the second set of rules. In some examples, the vehicle computing device may determine to apply different sets of rules based at least in part on a decreased level of confidence in an estimated position of the object in the second estimated state compared to the first estimated state. In such examples, the second set of rules may account for a larger potential for error in an estimated position of the object. For example, a first set of rules may be applied to an estimated state of the set of estimated states at a time t+3 and a second set of rules in an estimated state of the set of estimated states at a time t+6. The first set of rules may include a rule that a pedestrian located within 20 meters of the vehicle is relevant to the vehicle, and the second set of rules may include a rule that a pedestrian located within 30 meters of the vehicle is relevant to the vehicle.

In various examples, the vehicle computing system may perform the relevance verification(s) randomly throughout the period of time (e.g., at 2.5 seconds, at 7.3 seconds, with the $52^{nd}$ estimated state of a set of estimated states, etc.). In some examples, the vehicle computing system may perform the relevance verification(s) periodically throughout the period of time (e.g., every 2 seconds, 4 seconds, 5 seconds, every 10 estimated states, 20 estimated states, etc.). In some examples, the relevance frequency may be a pre-determined frequency. In some examples, the vehicle computing system may determine the frequency of relevance verification(s) dynamically, such as based on a number of objects detected in the environment, a number of relevant objects in the environment, or the like. For example, a vehicle computing system may perform a single relevance verification in an estimated state half-way through a time period associated therewith based on a number of detected objects being above a threshold number. In such an example, a number of relevance verifications may be limited based on the computational resources required to determine relevance associated with more than the threshold number of objects.

In various examples, the vehicle computing system may determine a current processing unit usage and/or memory usage and determine whether to perform relevance verifications. In some examples, the vehicle computing system may determine that a processing unit usage and/or memory usage is below a threshold and may determine to not perform relevance verifications. In some examples, the vehicle computing system may determine that a processing unit usage and/or memory usage meets or exceeds a threshold, and based on the threshold being met or exceeded, may determine to perform additional relevance verifications (such as, to omit data associated with additional relevant objects from calculations). In some examples, the vehicle computing system may determine a current processing unit usage and/or memory usage and determine whether to disregard an object based on the processing unit usage and/or memory usage. In such examples, the vehicle computing system may determine that a current processing unit usage and/or memory usage meets or exceeds a threshold value and based on the threshold being met or exceeded, the vehicle computing system may disregard the object.

Based on a determination of relevance of an object during a relevance verification, the vehicle computing system may continue to include data associated with the object in the remaining estimated states of the set of estimated states. Based on a determination of irrelevance of an object during the relevance verification, the vehicle computing system may omit data associated with the object in the remaining estimated states of the set of estimated states (e.g., disregard the object in subsequent calculations associated with estimated states).

In various examples, the vehicle computing system may store sensor data associated with actual location of a relevant object at the end of the set of estimated states (e.g., end of the period of time). In some examples, the vehicle computing system may provide the data to a remote computing device (i.e., computing device separate from vehicle computing device) for data analysis. In such examples, the remote computing system may analyze the sensor data to determine an actual location, velocity, direction of travel, or the like of the relevant object at the end of the set of estimated states. For example, the vehicle computing device may send a remote computing device an 8 second time period as well as data corresponding actual location and/or trajectory data associated with a relevant object throughout the set of estimated states and/or at time T=8. In some examples, the remote computing system may compare the actual location and/or trajectory with the position and/or trajectory data associated with a last estimated state in the set of estimated states. Using the example above with a period of time of 8 seconds, the remote computing system may compare the position and/or trajectory of the relevant object in the estimated state at T=8 (and/or throughout the period of time) with the actual position and/or trajectory of the relevant object. In some examples, the remote computing system may utilize the actual location(s) and/or trajectory of the relevant object to train a data model using machine learning techniques to determine trajectories associated with an object and/or relevance of the object to a vehicle (e.g., minimize differences between a predicted trajectory and an actual trajectory, refine relevance determinations, etc.). In such examples, the remote computing system may provide the data model to the vehicle computing device to improve trajectory determination and/or relevance determination of objects in the environment. The remote computing device may utilize techniques for minimizing differences between actual and predicted positions and/or predicted trajectories as described in U.S. patent application Ser. No. 16/282,201, which is incorporated herein by reference.

The techniques discussed herein may improve a functioning of a vehicle computing device in a number of ways. Traditionally, in control planning for an autonomous vehicle, a vehicle computing device may consider each detected dynamic object in an environment. The vehicle computing device may determine an action for the autonomous vehicle to take based on the detected objects. However, including each detected object in planning considerations (e.g., trajectory determinations, calculations, etc.) can be extremely computationally expensive, particularly when there are numerous objects in an environment. By performing an initial relevance determination of the detected objects in an environment, the techniques described herein may reduce a computational load to simulate predicted trajectories of objects in the environment, thereby improving the functioning of the vehicle computing device.

Additionally, the vehicle computing system described herein may perform one or more relevance verifications during a set of estimated states to simulate future relative positions and/or trajectories of a vehicle and relevant object(s). The vehicle computing system may determine, during the relevance verification, that a previously determined relevant object is no longer relevant to the vehicle (e.g., will not occupy the same space and time in the future). The vehicle computing system may disregard the previously determined relevant object in future estimated states, thereby further reducing computational load to simulate predicted trajectories of objects in the environment and improving the functioning of the vehicle computing device.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data).

FIG. 1 is an illustration of an autonomous vehicle 102 (vehicle 102) in an environment 100, wherein a dynamic object relevance system may determine whether objects in the environment may be relevant to the vehicle 102. A vehicle computing device may perform the dynamic object relevance system of the vehicle 102. While described as a separate system, in some examples, the object relevance determination techniques described herein may be implemented by other vehicle systems, components, and/or computing devices. For example, and as will be described in further detail with regard to FIG. 3, the object relevance determination techniques described herein may be implemented at least partially by or in associated with a planning component 324.

In various examples, the vehicle computing device may be configured to detect one or more dynamic objects 104 (e.g., objects 104) in the environment 100, such as via a perception system. The vehicle computing system may detect the object(s) 104 based on sensor data received from one or more sensors. In some examples, the sensor(s) may include sensors mounted on the vehicle 102, such as, for examples, cameras, motion detectors, lidar, radar, etc. In some examples, the sensor(s) may include one or more remote sensors, such as, for example sensors mounted on another autonomous vehicle, and/or sensors 106 mounted in the environment 100.

In various examples, vehicle 102 may be configured to transmit and/or receive data from other autonomous vehicles and/or the sensors 106. The data may include sensor data, such data regarding object(s) 104 detected in the environment 100. In various examples, the environment 100 may include the sensors 106 for traffic monitoring, collision avoidance, or the like. In some examples, the sensors 106 may be mounted in the environment to provide additional visibility in an area of reduced visibility, such as, for example, in a blind or semi-blind intersection. For example, an intersection in the environment 100 may be determined to have a blind intersection, where approaching vehicles 102 may not be able to perceive objects 104 and/or other vehicles approaching from the left or right on the intersecting road. The intersection in the environment may thus include a sensor 106 to provide sensor data to an approaching vehicle 102 regarding an object 104, such as object 104(2), located on the intersecting road.

In various examples, the vehicle computing system may receive the sensor data and may determine a type of object 104 (e.g., classify the type of object), such as, for example, whether the object 104 is a car, such as objects 104(1) and 104(2), a truck, motorcycle, moped, bicyclist, pedestrian, such as object 104(3), or the like. In various examples, the vehicle computing system may determine one or more predicted object trajectories 108 (trajectories 108) based on the sensor data and/or the type of object 104, such as trajectories 108(1), 108(2), and 108(3) associated with objects 104(1), 104(2), and 104(3), respectively. In some examples, the trajectories 108 may include any number of potential paths in which the object 104 may travel from a current position (e.g., at the time of perception) and/or based on a direction of travel. In some examples, a potential path for an object 104 may include remaining stationary, such as object 104(2) stopped at an intersection 110 in the environment 100. In such an example, the corresponding trajectory 108, such as 108(2), may represent little to no motion. In some examples, the number of trajectories may vary depending on a variety of factors, such as the classification of the object (e.g., type of object), other stationary and/or dynamic objects, drivable surfaces, etc.

In various examples, the trajectories 108 may be determined assuming a constant velocity and/or direction of travel of the object 104. In some examples, the vehicle computing system may determine an initial location, direction of travel, and velocity of the object 104 and determine the trajectory 108 based on the object 104 maintaining the velocity and direction of travel throughout the period of time. For example, based on a determination that object 104(2) is stopped at the intersection 110 with a red light, the vehicle computing system may determine that the trajectory 108(2) may remain constant with substantially zero velocity. In some examples, the constant velocity may be based on a known speed limit in the environment. In various examples, the trajectories 108 may include varied velocities, accelerations, and/or decelerations of the object 104. In such examples, the varied velocities may be based on a predefined velocity for a maneuver, such as, for example, slowing 10 mph less than the speed limit for a turn and accelerating back to the speed limit.

In various examples, the trajectories 108 may be determined based on a predicted motion of the object as determined by a prediction system of the vehicle. In some examples, the trajectories 108 may be based on passive prediction. In such examples, the trajectory 108 associated with the object 104 remains constant regardless of an action performed by the vehicle 102 and/or other objects 104. For example, a potential action for the vehicle 102 may include making a lane change to the left, bringing the vehicle 102 closer to an object 104 located in an adjacent lane to the new lane for the vehicle 102. The vehicle computing system may determine that the trajectory 108 associated with the object 104 remains the same despite the vehicle 102 potential action.

In some examples, the trajectories 108 associated with objects 104 may be based on active prediction. Active prediction includes determining potential and/or likely reactions an object 104 may have based on a potential action of vehicle 102. Using the example from above, the vehicle computing system may determine that the object 104 located in the adjacent lane may accelerate or decelerate based on the vehicle 102 lane change. Accordingly, the vehicle computing system may determine one or more possible trajectories 108 associated with the object 104 based on a reaction to the vehicle 102.

In various examples, the trajectories 108 may be determined utilizing one or more machine learning algorithms. In such examples, the vehicle computing system, such as via a prediction system, may receive the sensor data associated with the object 104 and predict a behavior of the object 104 based on the sensor data. For example, the vehicle computing system may be trained on captured image data of object 104 motion over time such that the vehicle computing system may recognize behavior that may suggest future actions (e.g., trajectories 108) the object 104 may take. Additionally, or in the alternative, the vehicle computing system may utilize heat maps, tree search methods, and/or temporal logic formulas to determine one or more trajectories 108 of the objects 104.

In various examples, the vehicle computing system may determine an initial relevance of each detected object 104 in the environment 100 to the vehicle 102. The initial relevance may be based on a determination that a detected object 104 may occupy the same space as the vehicle 102 at an initial time (e.g., current time) and/or over a time period (e.g., 4 seconds, 8 seconds, 10 seconds, 1 minute, etc.). In some example, the time period may include a predetermined amount of time. In at least one example, the time period may be eight (8) seconds. In some examples, the time period may be based on one or more operating factors associated with the vehicle 102, such as speed, environmental factors (e.g., congested area (e.g., a number of detected objects 104), size of a road (e.g., number of lanes, width of lanes, etc.), proximity to intersection, proximity to a playground, school zone, speed limit associated with the road, etc.), weather considerations (e.g., rain, sleet, snow; ice, wind, etc.), timing factors (e.g., a time of day, day of the year, etc.), or the like.

The initial relevance may be based on geometric data (e.g., distance, angle, direction of travel, velocity, acceleration, trajectory, etc.), semantic data (e.g., classification of the object), or a combination thereof. In various examples, the vehicle computing system may utilize machine learning techniques to determine an initial relevance of a detected object. In such examples, the machine learning algorithms may be trained to determine, based on geometric and/or semantic data, that an object 104 is or is irrelevant to the vehicle 102. In some examples, the vehicle computing system may utilize one or more rules to determine an initial relevance of a detected object 104. In some examples, the rule(s) applied to a particular object 104 may be based on a semantic classification of the object 104. For example, a first set of rule(s) may be applied to a pedestrian and a second set of rule(s) may be applied to a bus to determine whether the pedestrian and/or the bus are relevant to the vehicle 104. In various examples, the rule(s) may be determined using machine learning techniques. In such examples, machine learning algorithms may be trained to generate rule(s) (e.g., threshold distances, relative locations, etc.) for determining relevance of an object 104.

In some examples, the rule(s) may be determined based on predictability of an object 104. The predictability of the object 104 may be determined based on a classification of the object 104. For example, a train may be a predictable object with regard to direction of travel, velocity, and acceleration. The vehicle computing system may apply determine rules to apply based on the known predictability of the train.

In some examples, the rule(s) may include a threshold distance (e.g., 20 feet, 10 yards, 20 meters, etc.) between the vehicle 102 and the object. In such examples, if the object 104 located at a distance that is greater than a threshold distance away from the vehicle 102, the object 104 may be determined to be irrelevant. The threshold distance may be based on a classification associated with the object 104, a speed associated with the vehicle 102 and/or object 104, a trajectory 108 associated with the object, a vehicle trajectory 112. For example, a first threshold distance associated with a pedestrian may be 30 meters, and a second threshold distance associated with a bus may be 50 meters.

In some examples, the rule(s) may include a location of the object 104 relative to the vehicle 102, such as the object being located substantially in front of, behind, abeam the vehicle 102, etc. The relative location of the object 104 may be based in part on a vehicle trajectory 112 and/or the trajectory 108 of the object 104. For example, a pedestrian, such as that illustrated by object 104(3), may be located substantially abeam the vehicle 102 and traveling in an opposite direction to the vehicle 102. Based at least in part on the location of the object 104(3), the trajectory 108(3), and the semantic classification as a pedestrian, the vehicle computing device may determine that it is irrelevant to the vehicle. Additionally, or in the alternative, the vehicle computing system may determine that the object 104(3) is greater than a threshold distance away from the vehicle 102 and is therefore irrelevant to the vehicle 102. In at least some examples, such a location may be an absolute location of the object 104 (e.g., independent of the relative location to the vehicle 102). In some examples, absolute locations may correspond to various locations in a map that may be deemed important such that all entities in such an area are considered (for example, intersections, school zones, construction zones, and the like). In some examples, absolute locations may correspond to various locations in the map that are deemed to be unimportant such that the entities identified in the locations may be disregarded. In some examples, the absolute location may be considered in the relevance determination, such as, for example, as being associated with a rule. For example, a pedestrian with an absolute location corresponding to a sidewalk on an opposite side of a road (compared to the vehicle) with a median barrier may be determined to be irrelevant to the vehicle. For another example, a car with an absolute location corresponding to a parking lane may be determined to be irrelevant to the vehicle.

In various examples, the rule(s) may be based at least in part on environmental factors, weather factors, and/or timing factors (e.g., a time of day, day of the year, etc.). In such examples, the vehicle computing system may increase and/ or decrease values associated with one or more rules based on the environmental factors, weather factors, and/or timing factors. For example, the vehicle computing device may increase the threshold distances corresponding to pedestrians when the vehicle 102 is operating in proximity to a playground or in a school zone. For another example, the vehicle computing device may determine that it is snowing in the environment and that the snow may affect the driving conditions (e.g., longer stopping distances, etc.). Based on the detection of snow; the vehicle computing device may increase the threshold distances corresponding to the relative estimated positions of the vehicle 102 and the object(s) 104.

As an illustrative example, and not intending to be limiting, the vehicle computing system may determine that object 104(3) will not occupy the same space as the vehicle 102 at an initial time and/or during the time period and is therefore is irrelevant to the vehicle 102. Based on an initial determination of irrelevance to the vehicle 102, the vehicle computing system (at time T=0) may disregard the object 104(3) from control planning considerations (e.g., omit data associated with the object 104(3) from a set of estimated states associated with an action).

Additionally, as an illustrative example, the vehicle computing system may determine that objects 104(1) and 104(2) may occupy the same space as the vehicle 102 (e.g., determination of relevance to the vehicle 102) during the time period. Based on an initial relevance determination (at time T=0), the vehicle computing device may store data associated with the relevant objects 104(1) and 104(2). The data may include a classification, a location, and/or trajectory data associated with the relevant objects 104(1) and 104(2). Though the illustration in FIG. 1 includes two relevant objects, the vehicle computing system may be configured to identify a greater or fewer number of relevant objects. The vehicle computing system may consider the data associated with the relevant objects 104(1) and 104(2) in control planning considerations.

In various examples, the vehicle computing system may be configured to determine actions to take while operating (e.g., control planning) based on the relevant objects 104(1) and 104(2). The actions may include reference actions (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub action).

In various examples, the vehicle computing system may be configured to determine actions (e.g., reference actions and one or more associated sub-actions) that are applicable to the vehicle 102 in the environment 100. A determination of applicability may be based on a location of an object 104, a trajectory 108 associated with the object 104, environmental factors, weather factors, and/or timing factors. For example, based on a determination that a vehicle 102 is operating in a left-most lane of a road, such as that illustrated in FIG. 1, the vehicle computing system may determine that a lane change to the left is not an applicable action for the vehicle 102 in the environment 100. For another example, the vehicle computing system may be configured to not increase speed of a vehicle 102 when ice or snow is detected. In such an example, based on a detection of ice or snow, the vehicle computing system may determine that the increase in speed sub-action is not applicable to the vehicle 102 in the environment 100. For yet another example, inner-most lanes on a road may be adjusted to operate in a first direction for a morning commute and another direction for an evening commute. Based on a time of day, the vehicle computing system may determine that a lane change left is not applicable based on a left lane traffic flow direction shift in an opposite direction of a vehicle trajectory 112.

In various examples, for each applicable action and sub-action, the vehicle computing system may generate a set of estimated states of the vehicle and a relevant object 104, such as objects 104(1) and/or 104(2), into the future. In some examples, the vehicle computing device may generate a set of estimated states for each relevant object 104 individually. For example, the vehicle computing system may generate a first set of estimated states including the vehicle and a first relevant object 104(1) and a second set of estimated states including the vehicle and a second relevant object 104(2). In some examples, the set of estimated states may include the vehicle and each object 104 in the environment that is determined to be relevant, such as both objects 104(1) and 104(2).

The set of estimated states may include one or more estimated states of vehicle 102 and object 104 movement throughout a time period. In various examples, the movement of the vehicle 102 may be based on associated action and/or sub-action. As will be discussed in greater detail below with respect to FIG. 3, in some examples, the movement of the vehicle 102 may be based on a planned course and/or speed of the vehicle through the environment, such as that determined by planning component 324.

In various examples, the movement of the relevant object 104 may be based on a trajectory 108 associated therewith. In some examples, the movement of the relevant object 104 may be based on a substantially constant velocity profile. In such examples, the substantially constant velocity may be determined based on a detected velocity (e.g., trajectory 108) of the object, a speed limit associated with the environment, or the like. In some examples, the movement of the relevant object 104 may be based on a varied velocity profile. In such examples, the vehicle computing system may determine the changes to velocity of the object based on one or more factors, such as slowing during an approach to an intersection 110, traffic light considerations (e.g., accelerating into intersection 110), school zone, pedestrians in proximity, etc.

In various examples, the vehicle computing system may determine movement of the relevant object 104 based on an assumption that a lateral motion associated therewith will remain substantially constant (e.g., substantially constant direction of travel). In such examples, a lateral motion profile associated with the relevant object 104 may remain substantially constant. In some examples, the lateral motion associated with the relevant object 104 may remain within a threshold amount of lateral travel from an initial position (e.g., 2 feet left or right, 1 yard left or right of an initial position). In various examples, the velocity and/or lateral motion of the relevant object 104 may be based on passive prediction. In such examples, the vehicle computing system may determine that the movement of the relevant 104 does not change substantially based on an action of the vehicle 102 and/or other objects 104 in the environment. In some examples, the velocity and/or lateral motion of the object may be based on active prediction. In such examples, the velocity and/or lateral motion may be determined based on an estimated reaction of the relevant object 104 to the action of the vehicle and/or other objects 104 in the environment.

In various examples, the vehicle computing system may utilize machine learning techniques to determine the movement of the relevant object 104 in the environment. In such examples, machine learning algorithms may be trained to determine movement of a relevant object 104 in an environment based on various input factors, such as environmental factors, weather factors, timing factors, known reactions to particular classes of objects 104 or vehicles in proximity, or the like.

The estimated state(s) may each represent an estimated position of the vehicle 114 and an estimated position of one or more relevant objects 116. The estimated position of the vehicle 114 and the estimated position of relevant objects 116 may be based on the movement of the vehicle 102 (e.g., vehicle trajectory 112 based on an action, etc.) and the movement of the relevant object 104 (e.g., trajectory 108), respectively. The illustrative example depicted in FIG. 1 depicts a plurality of estimated positions corresponding to a plurality of estimated states. For example, estimated positions of the vehicle 114(1), 114(2), 114(3), 114(4), and 114(5) correspond to estimated states 1 through 5, and estimated positions of the relevant object 116(1), 116(2), 116(3), and 116(4) correspond to estimated states 1 through 4.

In various examples, the vehicle computing system may generate estimated states periodically throughout the time period, such as at predetermined intervals (e.g., every 0.1 second, every 0.5 seconds, every second, etc.). In at least one example, the vehicle computing system may generate estimated states every 0.1 second over the time period. In various examples, the vehicle computing system may generate a new set of estimated states associated with the action periodically, such as every 0.1 second, 0.5 seconds, or the like. In such examples, the vehicle computing system may run each set of estimated states, generating corresponding estimated states, in parallel.

In various examples, the vehicle computing system may perform one or more relevance verifications during a set of estimated states. The relevance verification(s) may include a determination that an object previously determined to be relevant to the vehicle 102 remains relevant to the vehicle (e.g., may occupy the same space as the vehicle 102 for the remainder of the set of estimated states). In various examples, a relevance verification may determine whether an action and/or sub-action is independent of an object 104 (e.g., the object 104 has no bearing on the vehicle 102 performing the action) previously determined to be relevant. In some examples, the relevance verification(s) may be performed substantially concurrently with one or more estimated states of the set of estimated states, such as utilizing data associated with a respective estimated state. The relevance verification(s) may be based on geometric data (e.g., distance, angle, direction of travel, velocity, acceleration, trajectory, etc.), semantic data (e.g., classification of the object), or a combination thereof. In various examples, the vehicle computing system may compare an estimated position of the vehicle 114 in an estimated state to an estimated position of the object 116 in the estimated state. For example, for a fourth estimated state, the vehicle computing system may compare the estimated position of the vehicle 114(4) to the estimated position of the relevant object 116(4) to determine if the relevant object remains relevant to the vehicle.

In various examples, the vehicle computing system may utilize machine learning techniques to verify relevance of a relevant object 104. In such examples, the machine learning algorithms may be trained to determine, based on geometric and/or semantic data, that an object 104 is or is irrelevant to the vehicle 102 at a particular time during the set of estimated states (e.g., time period). In some examples, the vehicle computing system may apply one or more rules (e.g., set of rules) based on the geometric data and/or the semantic data to determine if the relevant object 104 remains relevant to the vehicle 102. In some examples, the rule(s) may be generated utilizing machine learning techniques. In such examples, machine learning algorithms may be trained to generate one or more rules for determining relevance of an object. As discussed above with regard to the initial relevance determination, the rule(s) may be based on a classification associated with the relevant object 104. In some examples, the rule(s) may be based on predictability of the classification associated with the relevant object 104. The rule(s) may include relative distances (e.g., threshold distance from vehicle 102), relative locations (e.g., in front, behind, abeam the vehicle 102, etc.), comparison of trajectory 108 to vehicle trajectory 112 (e.g., speeds, and/or directions of travel between the vehicle 102 and the relevant object 104).

As discussed above, in some examples, the rule(s) may be based at least in part on environmental factors, weather factors, and/or timing factors. In such examples, the vehicle computing system may increase and/or decrease values associated with one or more rules based on the environmental factors, weather factors, and/or timing factors. For example, the vehicle computing device may increase the threshold distances corresponding to pedestrians when the vehicle 102 is operating in proximity to a playground or in a school zone. For another example, the vehicle computing device may determine that it ice is detected in the environment and that the ice may affect the driving conditions (e.g., longer stopping distances, etc.). Based on the detection of ice, the vehicle computing device may increase the threshold distances corresponding to object(s) 104.

The rule(s) may be the same or different from the one or more rules utilized to determine initial relevance of detected objects 104. In some examples, the vehicle computing system may apply a first set of rules to relevant object(s) 104 in a first estimated state and a second set of rules to the relevant object(s) in a second estimated state. In such examples, the relative distances, locations, and/or trajectories may differ from the first set of rules to the second set of rules. For example, the vehicle computing system may perform a first relevance verification substantially concurrently with a second estimated state and a second relevance verification substantially concurrently with a fourth estimated state. The vehicle computing system may apply a first set of rules in the first relevance verification, the first set of rules including a first threshold distance of 10 feet between the vehicle 102 and the relevant object 104 when the relevant object 104 is behind the vehicle 102. The vehicle computing system may then apply a second set of rules in the second relevance verification, the second set of rules including a second threshold distance of 20 feet between the vehicle 102 and the relevant object 104 when the relevant object 104 is behind the vehicle 102. In various examples, the differences between the first set of rules and the second set of rules may be based on a confidence level in a position associated with the vehicle 102 and/or the relevant object 104. In such examples, as a level of confidence in estimated positions of the vehicle 114 and the object 116 decreases, threshold distances may increase, and vice versa.

In some examples, the relevance verification(s) may be performed randomly during the set of estimated states. In such examples, the vehicle computing system may determine, at a random time during the set of estimated states (e.g., randomly selected estimated state) to verify the relevance of an object 104. In some examples, the relevance verification(s) may be performed periodically during the set of estimated states. In such examples, the vehicle computing system may verify relevance of objects 104 at periodic intervals (e.g., every 2 seconds, every 4 seconds, every 10 estimated states, every 20 estimated states, etc.). In some examples, the vehicle computing system may determine the frequency of relevance verification(s) dynamically, such as based on a number of objects 104 detected in the environment, a number of relevant objects 104 in the environment, or the like. For example, a vehicle computing system may determine to perform one relevance verification, such as at a point half-way through an estimated state based on a number of detected objects being above a threshold number. In such an example, a number of relevance verifications may be limited based on the computational resources required to determine relevance associated with more than the threshold number of objects. In some examples, the vehicle computing system may determine that a number of objects determined to be irirrelevant during a relevance verification may warrant the performance of additional relevance verifications. In such examples, the vehicle computing system may determine that a number of objects determined to be irirrelevant is above a threshold and/or an amount of computational resources made available by the irirrelevance determination is above a threshold and that an additional relevance verification may further increase computational resources (e.g., result in removal of data associated with one or more objects from the estimated state).

In various examples, the vehicle computing system may determine a current processing unit usage and/or memory usage and determine whether to perform relevance verification(s). In some examples, the vehicle computing system may determine that a processing unit usage and/or memory usage is below a threshold and may determine to not perform relevance verifications. In some examples, the vehicle computing system may determine that a processing unit usage and/or memory usage meets or exceeds a threshold, and based on the threshold being met or exceeded, may determine to perform additional relevance verifications (such as, in order to identify irrelevant objects and omit data associated therewith from subsequent calculations). In some examples, the vehicle computing system may determine a current processing unit usage and/or memory usage and determine whether to disregard an object based on the processing unit usage and/or memory usage. In such examples, the vehicle computing system may determine that a current processing unit usage and/or memory usage meets or exceeds a threshold value and based on the threshold being met or exceeded, the vehicle computing system may disregard the object.

In the illustrative example of FIG. 1, and not intending to be limiting, the vehicle computing system may perform a relevance verification substantially concurrently with the fourth estimated state. Utilizing estimated position data associated with the fourth estimated state, the vehicle computing system may compare respective estimated positions and determine a distance D between the estimated position of the vehicle 114(4) and the estimated position of the relevant object 116(4). Additionally, the vehicle computing system may determine a location of the estimated position of the object 116(4) relative to the estimated position of the vehicle 114(4) and associated directions of travel.

In various examples, the vehicle computing system may perform a relevance verification based on the comparison of the estimated position of the vehicle 114(4) and the estimated position of the object 116(4). Based on a determination that the distance D is less than a threshold distance and/or that the estimated position of the relevant object 116(4) is in a location relative to the estimated position of the vehicle 114(4) such that the relevant object 104 may be relevant to the vehicle 102 during the remainder of the time period, the vehicle computing system may continue to include data associated with the relevant object 104 in subsequent estimated states (e.g., estimated states representative of future times, positions, etc.).

At position 118, the vehicle computing device may determine that the distance D is equal to or greater than a threshold distances and/or that the estimated position of the relevant object 116(4) is in a location relative to the estimated position of the vehicle 114(4) such that the relevant object 104(1) becomes irirrelevant to the vehicle 102 (e.g., will not be relevant to the vehicle 102 throughout the remainder of the time period). Based on a determination of irirrelevance, the vehicle computing system may disregard data (e.g., omit data from calculations, exclude data) associated with the (formerly) relevant object 104(1) in subsequent estimated states and/or calculations associated therewith. For example, the vehicle computing system may determine the estimated position of the relevant object 116(4) is greater than a threshold distance behind the estimated position of the vehicle 114(4) and that the relevant object 104(1) and the vehicle 102 are traveling in opposite directions. As such, the relevant object 104(1) may be determined to be no longer relevant to the vehicle 102 in the environment and data associated therewith may be disregarded (removed) from future estimated states and/or other vehicle control planning operations.

The vehicle computing system may omit the data associated with object 104(1) (e.g., an object determined to be no longer relevant) from subsequent estimated states associated with the set of estimated states and/or estimated states associated with other sets of estimated states associated with the vehicle 102. In some examples, the subsequent estimated states may include estimated positions of the vehicle at the exclusion of the object 104(1). In such examples, the subsequent estimated states may not include data associated with the object 104(1). By omitting (e.g., removing) the data associated with irrelevant objects 104, such as object 104(1) from future estimated states (e.g., in the illustrative example, after a time associated with the fourth estimated state), the vehicle computing system may increase an amount of memory and processing power available for other calculations, programs, applications, etc. In some examples, the removal of data associated with the irrelevant object 104 may increase processing speed related to relevance determinations corresponding to other objects 104 in the environment 100. Accordingly, the techniques described herein may improve the functioning of the vehicle computing system.

Figure 2:
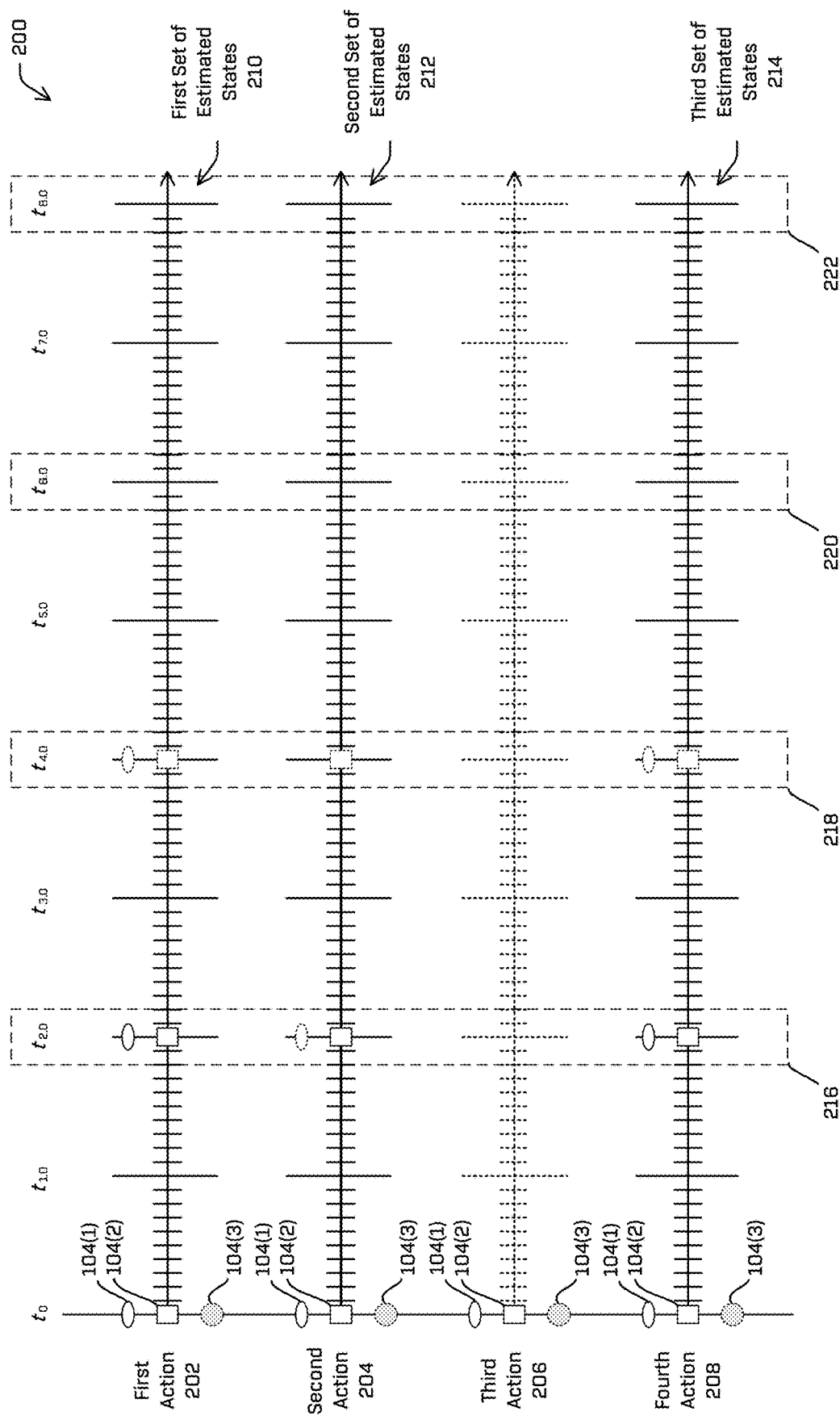
FIG. 2 is a collection of timelines illustrating example object relevance determinations corresponding to different vehicle actions.

FIG. 2 is a collection of timelines 200 illustrating object relevance determination corresponding to potential actions a vehicle may take while operating in an environment, such as first action 202, second action 204, third action 206, and fourth action 208. In some examples, the actions 202, 204, 206, and/or 208 may be pre-defined and stored in a memory of a vehicle computing device, such as that accessible by a planning component (e.g., planning component 324 of FIG. 3). In some examples the actions 202, 204, 206, and/or 208 may be determined by the planning component based on the environment. The actions 202, 204, 206, and/or 208 may include reference actions and/or sub-actions. Reference actions may include staying in a lane, changing lanes to the right, changing lanes to the left, going around an obstacle, aborting an obstacle go-around, or the like. Sub-actions may include maintaining a velocity, accelerating, decelerating, adjusting a position in a lane, or the like.

In various examples, the vehicle computing system may determine the actions 202, 204, 206, and/or 208 that the vehicle, such as vehicle 102 of FIG. 1, may take in an environment, such as environment 100. Though four actions are illustrated in FIG. 2, the first action 202, second action 204, third action 206, and fourth action 208, a greater or lesser number of actions may be considered by the vehicle computing system.

In various examples, the vehicle computing system may determine if an action is applicable to the vehicle in the environment at a particular time (e.g., initial time to of a set of estimated states). In such examples, the vehicle computing system may access pre-determined actions and determine whether each of the pre-determined actions are applicable to the environment. An action may be applicable to an environment based on a determination that it is capable of being performed in the environment (e.g., lane change left when vehicle is operating in the right-hand lane of a two-lane road), not capable of being performed in the environment (e.g., lane change while vehicle is operating on a single-lane road, etc.), logical to the environment (e.g., accelerating slowly in a school zone, etc.), not logical to the environment (e.g., accelerating rapidly in proximity to a playground, etc.), or the like. For example, the third action 206 may correspond to a left lane change for vehicle 102 in FIG. 1. Based on a determination that the vehicle 102 is operating in a left-most lane of the road, the vehicle computing system may determine that the third action 206 is not applicable to the vehicle at initial time to and may thus not generate estimated states corresponding to the third action 206.

In various examples, the vehicle computing system may determine, at an initial time ($t_0$), whether one or more detected objects, such as objects 104 of FIG. 1, are relevant to the vehicle. As discussed above, an object may be relevant to the vehicle if the object may occupy the same space as the vehicle over a time period, such as the time period illustrated in the collection of timelines 200. Continuing the example illustrated in FIG. 1, the collection of timelines 200 includes detected objects 104(1), 104(2), and 104(3). As discussed above, at an initial time to, the object 104(3) is determined to be irrelevant to the vehicle. Based on the determination of irrelevance, the object 104(3) is not considered (e.g., data associated with the object 104(3) is not included) in vehicle planning considerations (e.g., not included in the collection of timelines 200 as represented by broken lines associated with the symbol corresponding to object 104(3)). In the illustrative example, objects 104(1) and 104(2) may be determined to be relevant to the vehicle at the initial time to. Based on the initial determination of relevance, the objects 104(1) and 104(2) may be included vehicle planning considerations (e.g., included in the collection of timelines 200).

In the illustrative example of FIG. 2, the vehicle computing system may determine that the first action 202, the second action 204, and the fourth action 208 are applicable to the vehicle. Based on a determination of applicability, the vehicle computing system may perform a first set of estimated states 210 corresponding to the first action 202, a second set of estimated states 212 corresponding to the second action 204, and a third set of estimated states 214 corresponding to the fourth action 208. As discussed above, the set of estimated states 210, 212, and 214 may include one or more corresponding estimated states. In the illustrative example, each time interval $t_{1.0}$, $t_{2.0}$, $t_{3.0}$ represents estimated states corresponding to 1.0 second, 2.0 seconds, 3.0 seconds, etc. of a time period of eight (8) seconds (e.g., a time period associated with a set of estimated states). Additionally, each 0.1 interval represents estimated states corresponding to 0.1 second, 0.2 seconds, 0.3 seconds, and so on, throughout the time period. Though illustrated as periodic estimated states performed at 0.1 second intervals throughout an 8 second time period, other frequencies and/or time periods are contemplated. For example, estimated states may be generated at 0.2 second intervals for a time period of 10 seconds. Additionally, although illustrated at periodic intervals, the estimated states may be generated randomly throughout the time period.

In various examples, the estimated states may include an estimated position of the relevant objects, such as objects 104(1) and 104(2) (relevant objects 104(1) and 104(2)), relative to the vehicle. In some examples, estimated positions may be used by a planning component of the vehicle computing device to determine an action, such as first action 202, the second action 204 or the fourth action 208 to take while operating in the environment. In various examples, the action 202, 204, or 206 may be based at least in part on the estimated positions of the relevant objects 104(1) and 104(2) and/or the continued relevance of the objects throughout the time period.

In some examples, the vehicle computing device may be configured to perform one or more relevance verifications, such as relevance verifications 216, 218, 220, and 222, throughout the time period to determine whether relevant objects 104(1) and 104(2) remain relevant remain to the vehicle. In various examples, the relevance verifications 216, 218, 220, and 222 may be performed randomly. For example, a first relevance verification 216 may be performed using data associated with the twenty third estimated state and a second relevance verification 218 may be performed using data associated with a fifty-second estimated state. In various examples, the relevance verification(s) may be performed periodically throughout a set of estimated states. In such examples, the relevance verification(s) may be performed at pre-determined time intervals (e.g., 2 second intervals, 3 second intervals, 5 second intervals, etc.) and/or using data associated with pre-determined estimated states (e.g., every tenth estimated state, every twentieth estimated state, etc.). In some examples, the calculations may be performed at every simulated step in the future. In various examples, the determinations may be performed in accordance with computational resource loads (CPU, GPU, memory usage, and the like).

In the illustrative example, the vehicle computing device performs relevance verifications 216, 218, 220, and 222 at two second intervals and/or every twentieth estimated state for first action 202, second action 204, and fourth action 208 (e.g., the actions determined to be applicable to the vehicle at time to). As discussed above, for each relevance verifications 216, 218, 220, and 222, the vehicle computing device may compare an estimated position of the vehicle for each applicable vehicle action 202, 204, and/or 208 with an estimated position of one or more objects determined to be relevant to the vehicle at a previous time for each vehicle action. Based on the comparison, the vehicle computing device may determine whether the previously determined relevant object remains relevant to the vehicle in a respective set of estimated states 210, 212, and/or 214.

As illustrated in FIG. 2, in a first relevance verification 216, at time $t_{2.0}$, the vehicle computing device determines that both the relevant objects 104(1) and 104(2) are relevant to the vehicle performing the first action 202 and the fourth action 208 (e.g., simulated performance of the first action 202 and fourth action 208), and that relevant object 104(2) is relevant to the vehicle performing the second action 204. Based on the determination of relevance, the vehicle computing device includes data associated with the relevant objects 104(1) and 104(2) in subsequent estimated states of first set of estimated states 210 and the third set of estimated states 214, and data associated with relevant object 104(2) in remaining estimated states of the second set of estimated states 212. Additionally, in the illustrative example, the vehicle computing device determines that object 104(1) is no longer relevant to the vehicle performing the second action 204. Based on the determination of irrelevance, the vehicle computing system may not include data associated with the object 104(1) in subsequent estimated states associated with the second set of estimated states 212 (e.g., remove data associated with object 104(1) from the second set of estimated states 212). The removal of data associated with object 104(1) in subsequent estimated states may increase processing power and memory available for the set of estimated states 210, 212, and 214 and/or other functions of the vehicle computing system, thereby improving the functioning of the vehicle computing system.

Based on the relevance determinations of the first relevance verification 216, the vehicle computing system may generate subsequent estimated states for each action 202, 204, and 208 including data associated with objects determined to be relevant to the vehicle. In a second relevance verification 218, the vehicle computing device may compare an estimated position of the vehicle with estimated positions of the objects determined to be relevant (e.g., verified relevance) in the respective set of estimated states 210, 212, or 214, during the first relevance verification 216. As illustrated in FIG. 2, the vehicle computing device may determine that each of the objects 104(1) an 104(2) are irrelevant to the vehicle in the simulated performance of the first action and the fourth action and that object 104(2) is irrelevant to the vehicle in the simulated performance of the second action. Accordingly, the vehicle computing device may omit data associated with the objects 104(1) and 104(2) from subsequent estimated states in the first set of estimated states 210, the second set of estimated states 212, and the third set of estimated states 214.

As depicted in the illustrative example, based on a determination of irrelevance in the second relevance verification at $t_{4.0}$, the data associated with objects 104(1) and 104(2) is not included in future estimated states, such as those associated with third relevance verification 220 and fourth relevance verification 222. In various examples, based on a determination of irrelevance of each of the previously relevant objects, such as during the second relevance verification 218, the vehicle computing device may not perform subsequent relevance verifications, such as the third relevance verification 220 and the fourth relevance verification 222. By not performing the third relevance verification 220 and the fourth relevance verification 222, the vehicle computing device may have an increased amount of processing power and/or memory available to perform other computing actions, further improving the functioning of the vehicle computing device.

Figure 3:
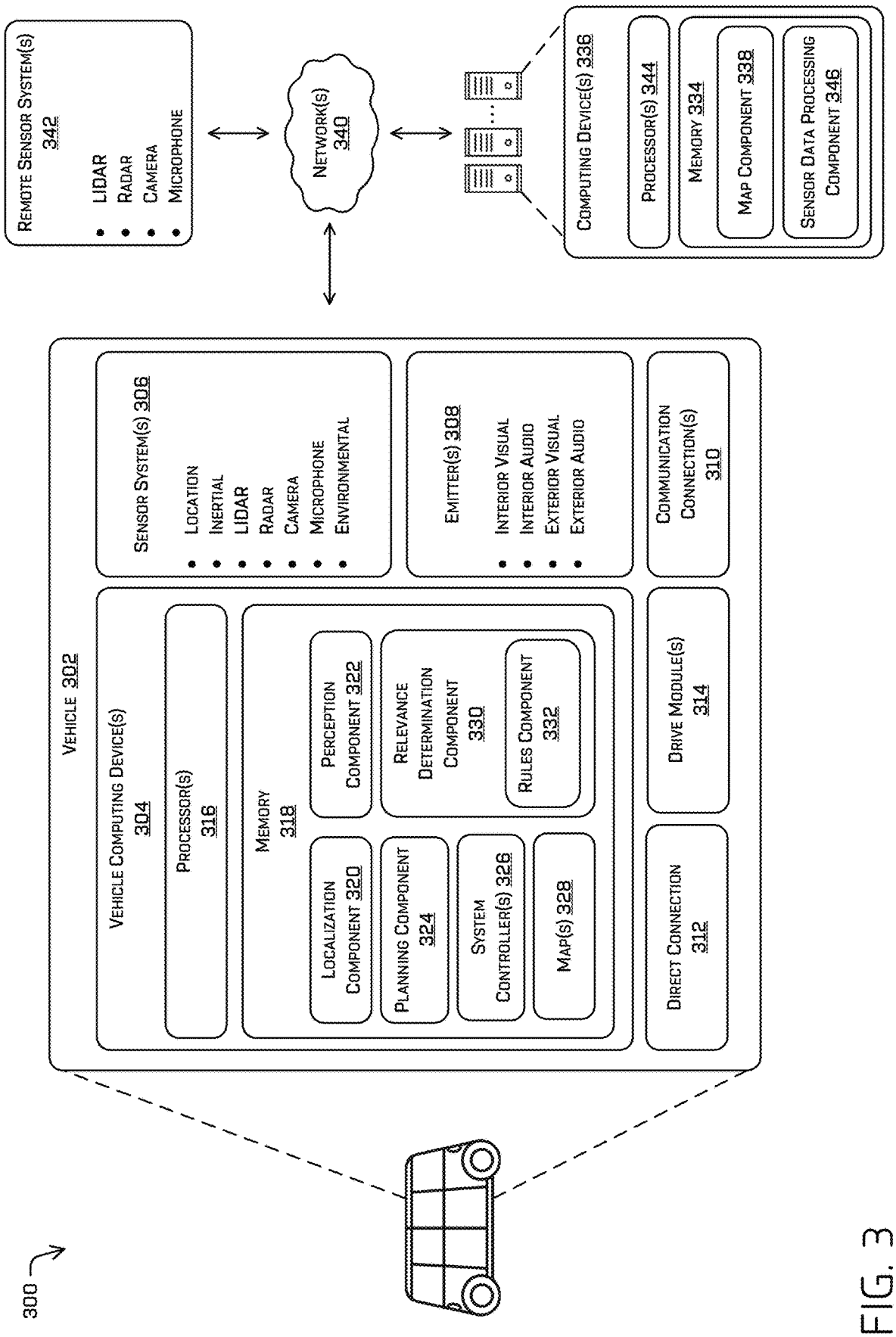
FIG. 3 is a block diagram of an example system for implementing the techniques described herein.

FIG. 3 is a block diagram of an example system 300 for implementing the techniques described herein. In at least one example, the system 300 may include a vehicle 302, such as vehicle 102.

The vehicle 302 may include a vehicle computing device 304, one or more sensor systems 306, one or more emitters 308, one or more communication connections 310, at least one direct connection 312, and one or more drive modules 314.

The vehicle computing device 304 may include one or more processors 316 and memory 318 communicatively coupled with the one or more processors 316. In the illustrated example, the vehicle 302 is an autonomous vehicle: however, the vehicle 302 could be any other type of vehicle, such as a semi-autonomous vehicle, or any other system having at least an image capture device (e.g., a camera enabled smartphone). In the illustrated example, the memory 318 of the vehicle computing device 304 stores a localization component 320, a perception component 322, a planning component 324, one or more system controllers 326, one or more maps 328, and a relevance determination component 330 including a rules component 332. Though depicted in FIG. 3 as residing in the memory 318 for illustrative purposes, it is contemplated that the localization component 320, a perception component 322, a planning component 324, one or more system controllers 326, one or more maps 328, and a relevance determination component 330 including a rules component 332 may additionally, or alternatively, be accessible to the vehicle 302 (e.g., stored on, or otherwise accessible by, memory remote from the vehicle 302, such as, for example, on memory 334 of a remote computing device 336).

In at least one example, the localization component 320 may include functionality to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment, such as from map(s) 328 and/or map component 33, and may continuously determine a location and/or orientation of the autonomous vehicle within the map. In some instances, the localization component 320 may utilize SLAM (simultaneous localization and mapping), CLAMS (calibration, localization and mapping, simultaneously), relative SLAM, bundle adjustment, irlinear least squares optimization, or the like to receive image data, lidar data, radar data, IMU data, GPS data, wheel encoder data, and the like to accurately determine a location of the autonomous vehicle. In some instances, the localization component 320 may provide data to various components of the vehicle 302 to determine an initial position of an autonomous vehicle for determining the relevance of an object to the vehicle 302, as discussed herein.

In some instances, the perception component 322 may include functionality to perform object detection, segmentation, and/or classification. In some examples, the perception component 322 may provide processed sensor data that indicates a presence of an object (e.g., entity) that is proximate to the vehicle 302 and/or a classification of the object as an object type (e.g., car, pedestrian, cyclist, animal, building, tree, road surface, curb, sidewalk, unknown, etc.). In some examples, the perception component 322 may provide processed sensor data that indicates a presence of a stationary entity that is proximate to the vehicle 302 and/or a classification of the stationary entity as a type (e.g., building, tree, road surface, curb, sidewalk, unknown, etc.). In additional or alternative examples, the perception component 322 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may include a sequence of waypoints for travelling between two locations. As irlimiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In some examples, the planning component 324 may include a prediction component to generate predicted trajectories of objects (e.g., objects) in an environment. For example, a prediction component may generate one or more predicted trajectories for objects within a threshold distance from the vehicle 302. In some examples, a prediction component may measure a trace of an object and generate a trajectory for the object based on observed and predicted behavior.

In at least one example, the vehicle computing device 304 may include one or more system controllers 326, which may be configured to control steering, propulsion, braking, safety, emitters, communication, and other systems of the vehicle 302. The system controller(s) 326 may communicate with and/or control corresponding systems of the drive module(s) 314 and/or other components of the vehicle 302.

The memory 318 may further include one or more maps 328 that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 302 may be controlled based at least in part on the map(s) 328. That is, the map(s) 328 may be used in connection with the localization component 320, the perception component 322, and/or the planning component 324 to determine a location of the vehicle 302, detect objects in an environment, generate routes, determine actions and/or trajectories to navigate within an environment.

In some examples, the one or more maps 328 may be stored on a remote computing device(s) (such as the computing device(s) 336) accessible via network(s) 340. In some examples, multiple maps 328 may be stored based on, for example, a characteristic (e.g., type of entity, time of day, day of week, season of the year, etc.). Storing multiple maps 328 may have similar memory requirements, but increase the speed at which data in a map may be accessed.

As illustrated in FIG. 3, the vehicle computing device 304 may include a relevance determination component 330. The relevance determination component 330 may be configured to determine relevance of one or more objects, such as objects 104 of FIG. 1, to the vehicle 302. In various examples, the relevance determination component 330 may receive one or more characteristics associated with the detected object(s) from the perception component 322 and/or from the sensor system(s) 306. In some examples, the relevance determination component 330 may receive environment characteristics (e.g., environmental factors, etc.) and/or weather characteristics (e.g., weather factors such as snow; rain, ice, etc.) from the perception component 322 and/or the sensor system(s) 306.

In various examples, the relevance determination component 330 may receive one or more predicted trajectories of the object (e.g., direction of travel, speed, etc.) from the planning component 324, such as from the prediction component thereof. In some examples, the relevance determination component 330 may receive one or more actions (e.g., reference actions and/or sub-actions) for the vehicle 302 from the planning component 324. In some examples, the relevance determination component 330 may be configured to determine relevance of detected objects based at least in part on the one or more actions for the vehicle 302. In some examples, the relevance determination component 330 may be configured to determine the actions that are applicable to the environment, such as based on environment characteristics, weather characteristics, or the like.

In various examples, the relevance determination component 330 may be configured to determine an initial relevance of detected objects in the environment. In various examples, the relevance determination component 330 may utilize machine learning techniques to determine the initial relevance of detected objects. In such examples, machine learning algorithms may be trained to determine whether an object is relevant to a vehicle in the environment. The initial relevance may be based on a possibility that the detected object may occupy the same space as the vehicle 302 over a time period (e.g., within a threshold distance of a path of the vehicle 302). In various examples, the initial relevance may be based on one or more rules. As discussed above, the rule(s) may be determined using machine learning techniques. In various examples, the rules component 332 may be configured to determine the rule(s) to apply to an initial relevance determination. The rule(s) may be based on semantic data and/or geometric data associated with the object. In at least one example, a set of rules applied to a detected object to determine the initial relevance therewith may be based on a classification of the object, a distance (e.g., threshold distance) between the detected object and the vehicle 302, an absolute location of the object, a relative position of the object, and respective directions of travel associated with the detected object and the vehicle 302.

In some examples, the rule(s) may be based on environment characteristics, weather characteristics, and/or a time associated with the vehicle operation (e.g., time of day, day of year, etc.). In some examples, values associated with the rule(s) data may be adjusted based on the environment, weather characteristics, and/or the time. For example, the relevance determination component 330 may receive environmental characteristics indicating that a location associated with the vehicle corresponds to a school zone and that a time of day and/or day of year corresponds to a school day. Based on the environmental characteristics and time of day, the rules component 332 may increase a threshold distance associated with a determination of relevance of pedestrians.

The relevance determination component 330 may generate sets of estimated states of the vehicle and one or more detected objects forward in the environment over a time period. The relevance determination component 330 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects determined to be relevant to the vehicle at an initial time (T=0) (e.g., current time).

The estimated positions may be determined based on a detected trajectory and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction. In some examples, the relevance determination component 330 may utilize machine learning, linear temporal logic, tree search methods, heat maps, and/or other techniques for determining predicted trajectories and/or estimated positions of objects.

In various examples, the estimated states may be generated periodically throughout the time period. For example, the relevance determination component 330 may generate estimated states at 0.1 second intervals throughout the time period. For another example, the relevance determination component 330 may generate estimated states at 0.05 second intervals. The estimated states may be used by the planning component 324 in determining an action for the vehicle 302 to take in an environment.

The relevance determination component 330 may be configured to verify the relevance of each object included in a set of estimated states (e.g., detected object, initially determined relevant object, etc.). In various examples, the relevance determination component 330 may perform relevance verifications randomly and/or periodically throughout the time period to determine continued relevance of an object to the vehicle, including every iteration and/or as needed to free up computational resources. As discussed above, the relevance verification(s) may include a determination that an object previously determined to be relevant to the vehicle 302 will remain relevant to the vehicle at a time in the future (e.g., may occupy the same space as the vehicle 302 during the time period associated with the set of estimated states). In some examples, the relevance verification(s) may be performed substantially concurrently with one or more estimated states of the set of estimated states. In some examples, the relevance verification(s) may be performed using data (e.g., estimated positions, etc.) associated with an estimated state. The relevance verification(s) may be based on geometric data (e.g., distance, angle, direction of travel, velocity, acceleration, trajectory, etc.), semantic data (e.g., classification of the object), or a combination thereof. In various examples, the relevance determination component 330 may compare an estimated position of the vehicle 302 in an estimated state to an estimated position of an object in the estimated state.

In various examples, the relevance determination component 330 may utilize machine learning techniques to verify relevance of a relevant object. In such examples, the machine learning algorithms may be trained to determine, based on geometric and/or semantic data, that an object is or is irrelevant to the vehicle 302 at a particular time during a set of estimated states (e.g., time period). In such examples, one or more of the vehicle 302 state (position, velocity, acceleration, trajectory, etc.) and/or the object state, classification, etc. may be input into such a machine learned model and, in turn, a determination of relevance may be output by the model (either binary or having some relative indication of relevance). In some examples, the relevance determination component 330 may apply one or more rules (e.g., set of rules) based on the geometric data and/or the semantic data to determine if the object remains relevant to the vehicle 302. As discussed above with regard to the initial relevance determination, the rule(s) may be based on a classification associated with the object. In some examples, the rule(s) may be based on predictability of the classification associated with the relevant object. The rule(s) may include relative distances (e.g., threshold distance from vehicle 302), relative locations (e.g., in front, behind, abeam the vehicle 302, etc.), trajectory comparisons (e.g., speeds, and/or directions of travel between the vehicle 302 and the object).

As discussed above, in some examples, the rules component 332 may determine the rule(s) based at least in part on environmental characteristics (e.g., environmental factors), weather characteristics (e.g., weather factors), and/or times associated with the corresponding estimated state and/or set of estimated states. In such examples, the environmental characteristics, weather characteristics, and/or time consideration may increase and/or decrease values associated with one or more of the rules. For example, the rules component 332 may determine that snow is detected in the environment and that the snow may affect the driving conditions (e.g., longer stopping distances, etc.). Based on the detection of snow; the vehicle computing device may increase the threshold distances corresponding to object(s).

The rule(s) may be the same or different from the one or more rules utilized to determine initial relevance of detected objects. In some examples, the rules component 332 may identify a first set of rules to apply to an object in a first estimated state and a second set of rules to apply to the object(s) in a second estimated state. In such examples, the relative distances, locations, and/or trajectories may differ from the first set of rules to the second set of rules. For example, the relevance determination component 330 may perform a first relevance verification substantially concurrently with a second estimated state and a second relevance verification substantially concurrently with a fourth estimated state. The relevance determination component 330 may apply a first set of rules in the first relevance verification, the first set of rules including a first threshold distance of 30 feet between the vehicle 302 and the object when the object is behind the vehicle 302. The relevance determination component 330 may then apply a second set of rules in the second relevance verification, the second set of rules including a second threshold distance of 50 feet between the vehicle 302 and the object when the object is behind the vehicle 302. In various examples, the differences between the first set of rules and the second set of rules may be based on a confidence level in a position associated with the vehicle 302 and/or the object. In such examples, as a level of confidence in estimated positions of the vehicle 302 and the object decreases, threshold distances may increase, and vice versa.

In some examples, the relevance verification(s) may be performed randomly during the set of estimated states. In such examples, the relevance determination component 330 may determine, at a random time during the set of estimated states (e.g., randomly selected estimated state) to verify the relevance of an object. In some examples, the relevance verification(s) may be performed periodically during the set of estimated states, including at every iteration. In such examples, the relevance determination component 330 may verify relevance of objects at periodic intervals (e.g., every 1.5 seconds, every 5 seconds, every 8 estimated states, every 16 estimated states, etc.). In some examples, the relevance may be determined based on computational resource availability (e.g., where more resources are needed, irrelevant entities may be disregarded for future operations).

Based on a determination that an object is relevant to the vehicle 302 at a time associated with a relevance verification estimated state, the relevance determination component 330 may continue to include data associated with the object in subsequent estimated states of the set of estimated states. Based on a determination that an object is no longer relevant to the vehicle at a time associated with a relevance verification estimated state, the relevance determination component 330 may remove data associated with the object from subsequent estimated states of the set of estimated states and/or other vehicle control planning operations. By removing the data associated with irrelevant objects from future estimated states, the relevance determination component 330 may increase an amount of memory and processing power available to the vehicle computing device 304 for other calculations, programs, applications, etc. In some examples, the removal of data associated with the irrelevant object may increase processing speed related to relevance determinations corresponding to other objects in the environment. Accordingly, the techniques described herein may improve the functioning of the vehicle computing system.

As can be understood, the components discussed herein (e.g., the localization component 320, the perception component 322, the planning component 324, the one or more system controllers 326, the one or more maps 328, the relevance determination component 530 including the rules component 332 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 318 (and the memory 334, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 306 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 may include multiple instances of each of these or other types of sensors. For instance, the lidar sensors may include individual lidar sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally or in the alternative, the sensor system(s) 306 may send sensor data, via the one or more networks 340, to the one or more computing device(s) 336 at a particular frequency, after a lapse of a predetermined period of time, in near real-time, etc.

The vehicle 302 may also include one or more emitters 308 for emitting light and/or sound. The emitters 308 may include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 may also include one or more communication connections 310 that enable communication between the vehicle 302 and one or more other local or remote computing device(s). For instance, the communication connection(s) 310 may facilitate communication with other local computing device(s) on the vehicle 302 and/or the drive module(s) 314. Also, the communication connection(s) 310 may allow the vehicle to communicate with other nearby computing device(s) (e.g., remote computing device 336, other nearby vehicles, etc.) and/or one or more remote sensor system(s) 342 for receiving sensor data.

The communications connection(s) 310 may include physical and/or logical interfaces for connecting the vehicle computing device 304 to another computing device or a network, such as network(s) 340. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the front and the rear, etc.). In at least one example, the drive module(s) 314 may include one or more sensor systems to detect conditions of the drive module(s) 314 and/or the surroundings of the vehicle 302. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The drive module(s) 314 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 may also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle. In some instances, the direct connection 312 may further releasably secure the drive module(s) 314 to the body of the vehicle 302.

In at least one example, the localization component 320, the perception component 322, the planning component 324, the one or more system controllers 326, the one or more maps 328, and the relevance determination component 330, may process sensor data, as described above, and may send their respective outputs, over the one or more network(s) 340, to the computing device(s) 336. In at least one example, the localization component 320, the perception component 322, the planning component 324, the one or more system controllers 326, the one or more maps 328, and the relevance determination component 330 may send their respective outputs to the remote computing device(s) 336 at a particular frequency, after a lapse of a predetermined period of time, in near real-time, etc.

In some examples, the vehicle 302 may send sensor data to the computing device(s) 336 via the network(s) 340. In some examples, the vehicle 302 may receive sensor data from the computing device(s) 336 and/or remote sensor system(s) 342 via the network(s) 340. The sensor data may include raw sensor data and/or processed sensor data and/or representations of sensor data. In some examples, the sensor data (raw or processed) may be sent and/or received as one or more log files.

The computing device(s) 336 may include processor(s) 344 and a memory 334 storing the map component 338 and a sensor data processing component 346. In some examples, the map component 338 may include functionality to generate maps of various resolutions. In such examples, the map component 338 may send one or more maps to the vehicle computing device 304 for navigational purposes. In various examples, the sensor data processing component 346 may be configured to receive data from one or more remote sensors, such as sensor system(s) 306 and/or remote sensor system(s) 342. In some examples, the sensor data processing component 346 may be configured to process the data and send processed sensor data to the vehicle computing device 304, such as for use by the relevance determination component 330. In some examples, the sensor data processing component 346 may be configured to send raw sensor data to the vehicle computing device 304.

The processor(s) 316 of the vehicle 302 and the processor(s) 344 of the computing device(s) 336 may be any suitable processor capable of executing instructions to process data and perform operations as described herein. By way of example and not limitation, the processor(s) 316 and 344 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 334 are examples of irtransitory computer-readable media. The memory 318 and 334 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 318 and 334 may include at least a working memory and a storage memory. For example, the working memory may be a high-speed memory of limited capacity (e.g., cache memory) that is used for storing data to be operated on by the processor(s) 316 and 344. In some instances, the memory 318 and 334 may include a storage memory that may be a lower-speed memory of relatively large capacity that is used for long-term storage of data. In some cases, the processor(s) 316 and 344 cannot operate directly on data that is stored in the storage memory, and data may need to be loaded into a working memory for performing operations based on the data, as discussed herein.

It should be noted that while FIG. 3 is illustrated as a distributed system, in alternative examples, components of the vehicle 302 may be associated with the computing device(s) 336 and/or components of the computing device(s) 336 may be associated with the vehicle 302. That is, the vehicle 302 may perform one or more of the functions associated with the computing device(s) 336, and vice versa.

FIGS. 4-7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 4:
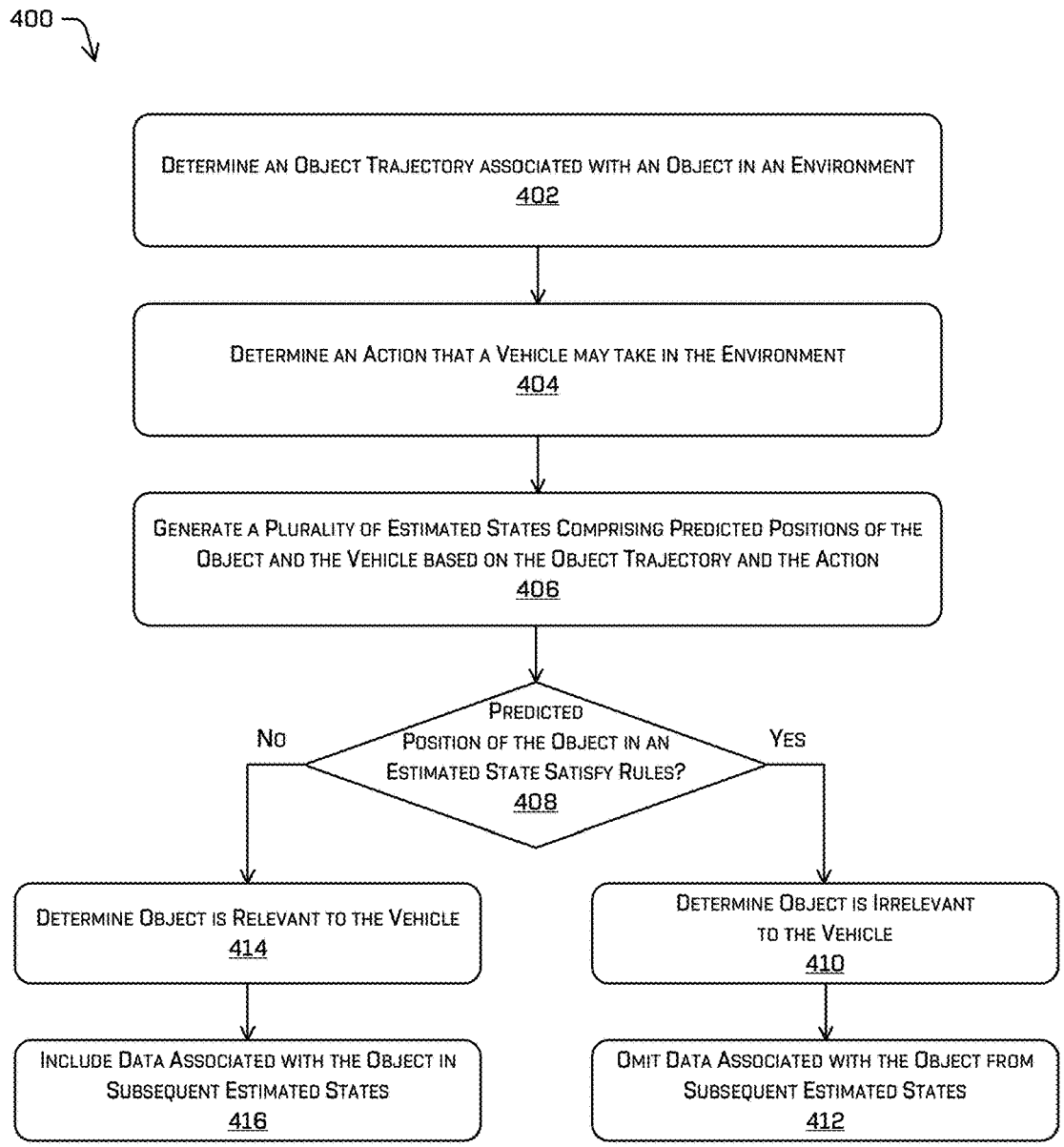
FIG. 4 depicts an example process for determining relevance of an object to a vehicle in an environment based on one or more rules.

FIG. 4 depicts an example process 400 for determining relevance of an object in an environment to a vehicle based on one or more rules. Some or all of the process 400 may be performed by one or more components in FIG. 3, as described herein. For example, some or all of process 400 may be performed by the vehicle computing device 304.

At operation 402, the process may include determining a predicted object trajectory (object trajectory) associated with an object in the environment. The object trajectory may represent a potential path the object may take through the environment. The vehicle computing system may be configured to detect an object and determine the trajectory thereof based on sensor data. The sensor data may be received from one or more sensors on the vehicle and/or from one or more remote sensors. In some examples, the vehicle computing system may be configured to determine one or more object trajectories representative of one or more potential paths the object may take through the environment. In some examples, the object trajectories may be determined based on an assumption of the object maintaining a substantially constant velocity and/or direction of travel. In some examples, the object trajectories may be determined utilizing one or more heat maps. In various examples, the object trajectories may be determined utilizing machine learning techniques. In such examples, one or more machine learning algorithms may be trained to determine object trajectories based on sensor data. In some examples, the object trajectories may be determined utilizing temporal logic, and/or tree search methods. In various examples, the object trajectories may be based on predictability of the object, such as based on a classification thereof. For example, a semi-truck may not be capable of rapid acceleration and/or turning above a threshold velocity. Accordingly, the vehicle computing device may determine that a semi-truck operating above a threshold velocity may continue in a same direction of travel (e.g., not turn) at substantially a same velocity throughout the time period.

At operation 404, the process may include determining an action that the vehicle may take while operating in the environment. In some examples, the action may be based on the detected object and/or the object trajectory associated therewith. The action may include a reference action such as a right lane change, a left lane change, staying in a lane, going around an obstacle (e.g., double-parked vehicle, traffic cones, etc.), or the like. The action may additionally include one or more sub actions, such as speed control (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub action).

In various examples, the vehicle computing system may be configured to determine a reference action and/or sub action(s) that are applicable to the vehicle in the environment. For example, lane changes may not be applicable reference actions for a vehicle operating on a single-lane road. For another example, accelerating may not be an applicable sub action for a vehicle operating at a speed limit.

At operation 406, the process may include generating a plurality of estimated states comprising predicted positions of the object and the vehicle based on the object trajectory and the action. The plurality of estimated states may represent future positions of the object and the vehicle over a time period. The plurality of estimated states may be generated randomly and/or periodically throughout the time period. For example, an estimated state may be generated every 0.1 seconds throughout the time period.

At operation 408, the process may include determining whether a predicted position associated with the object satisfies one or more rules corresponding to the estimated state. As discussed above, the rule(s) may be based on geometric and/or semantic data. In various examples, the rule(s) may be determined using machine learning techniques. In such examples, machine learning algorithms may be trained to generate the rule(s) for determining whether a predicted position of an object satisfies one or more rules. In some examples, the rule(s) may include relative distances (e.g., threshold distance from vehicle), relative locations (e.g., in front, behind, etc.), speeds, and/or directions of travel between the vehicle and the relevant object. In various examples, the rule(s) applied to the object may be based on a classification thereof. In such examples, the vehicle computing device may apply different rules for objects of different classes.

Based on a determination that the predicted position associated with the object satisfies the rule(s) ("Yes" at operation 408), at operating 410, the process may include determining that the object is irrelevant to the vehicle. The object may be irrelevant to the vehicle based on a determination that the object and the vehicle will not occupy the same space over the time period. Based on the determination of irrelevance, the vehicle computing device may, at operation 412, omit data associated with the object from subsequent estimated states associated with the action and/or other vehicle control planning operations.

Based on a determination that the predicted position associated with the object does not satisfy the rule(s) ("No" at operation 408), at operation 414, the process may include determining that the object is relevant to the vehicle at a time associated with the estimated state. The determination of relevance may be based on a possibility that the object could occupy the same space as the vehicle during the time period.

Responsive to a determination that the object is relevant, the vehicle computing device, at operation 416, may include data associated with the object in subsequent estimated states associated with the action.

Figure 5:
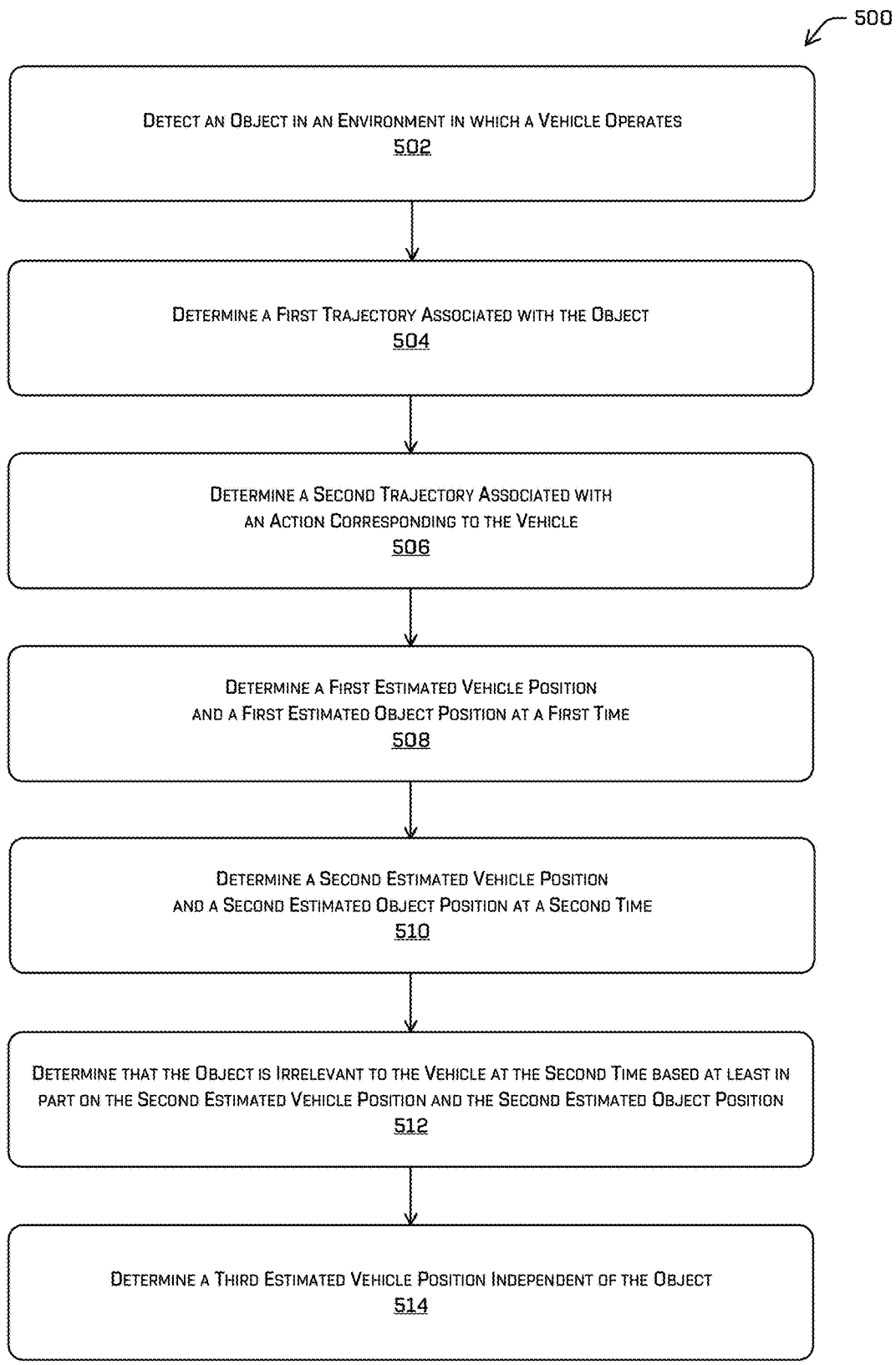
FIG. 5 depicts an example process for performing a relevance verification during a set of estimated states.

FIG. 5 depicts an example process 500 for performing a relevance verification during a set of estimated states. Some or all of the process 500 may be performed by one or more components in FIG. 3, as described herein. For example, some or all of the process 500 may be performed by the vehicle computing device 304.

At operation 502, the process may include detecting an object in an environment in which a vehicle operates. The vehicle computing device may be configured to detect the object based on sensor data. The sensor data may be received from one or more sensors on the vehicle and/or from one or more remote sensors.

At operation 504, the process may include determining a first trajectory associated with the object (predicted object trajectory). The vehicle computing system may be configured to determine a first trajectory of the detected object based on the sensor data. In some examples, the vehicle computing system may be configured to determine one or more predicted object trajectories representative of one or more potential paths the object may take through the environment. In some examples, the predicted object trajectories may be determined based on an assumption of the object maintaining a substantially constant velocity and/or direction of travel. In some examples, the predicted object trajectories may be determined utilizing one or more heat maps. In various examples, the predicted object trajectories may be determined utilizing machine learning techniques. In such examples, one or more machine learning algorithms may be trained to determine predicted object trajectories based on sensor data. In some examples, the predicted object trajectories may be based at least in part on predicted behaviors associated with the object. For example, a predicted object trajectory associated with a train may be based on a track direction and/or operating speeds in the environment. In various examples, the predicted object trajectories may be based on active and/or passive prediction techniques.

At operation 506, the process may include determining a second trajectory associated with an action of the vehicle. In some examples, the action may be based on the detected object and/or the first trajectory associated therewith. As described above, the action may include a reference action and one or more sub actions. In various examples, the vehicle computing system may be configured to determine a reference action and/or sub action(s) that are applicable to the vehicle in the environment, such as based on a vehicle position, speed, or the like.

At operation 508, the process may include determining a first estimated vehicle position and a first estimated object position at a first time. In some example, the vehicle computing device may generate a first estimated state of a set of estimated states, the first estimated state comprising the first estimated vehicle position and the first estimated object position at a first time. The first estimated state may represent estimated positions of the vehicle and the object at a first time of a time period. The set of estimated states may include a plurality of estimated states, each estimated state being representative of estimated positions of the vehicle and the object at respective times over the time period (e.g., future times).

At operation 510, the process may include determining a second estimated vehicle position and a second estimated object position at a second time. IN some examples, the vehicle computing device may generate a second estimated state of the set of estimated states, the second estimated state comprising the second estimated vehicle position and the second estimated object position at a second time. In various examples, a time between the first estimated state and the second estimated state may correspond to a pre-determined interval. In such examples, the estimated states of the set of estimated states may be generated periodically. In at least one example, a time between estimated states in a set of estimated states may be 0.1 second.

At operation 512, the process may include determining that the object is irrelevant to the vehicle at the second time based at least in part on the second estimated vehicle position and the second estimated object position. In various examples, the vehicle computing device may perform a relevance verification utilizing data associated with an estimated state. In various examples, the vehicle computing device may determine that the object is irrelevant to the vehicle based on geometric data (e.g., distance, angle, direction of travel, velocity, acceleration, trajectory, etc.) and/or semantic data (e.g., classification). In some examples, the relevance determination may be based on a comparison between the second estimated vehicle position and the second estimated object position. In some examples, the relevance determination may be based on the first trajectory associated with the object and/or the second trajectory associated with the action. In some examples, the relevance may be based on an application of one or more rules. In such examples, based on the second estimated object position and/or the first trajectory associated with the object satisfying one or more rules, the object may be determined to be irrelevant to the vehicle at the second time.

At operation 514, the process may include determining a third estimated vehicle position independent of the object. In some examples, the vehicle computing device may generate a third estimated state comprising the third estimated vehicle position. The third estimated vehicle state and/or the third estimated state may omit data associated with the object (e.g. vehicle position independent of the object). In some examples, the vehicle computing system may omit data associated with the object from subsequent estimated states associated with the action and/or other vehicle control planning operations. In some examples, the data associated with the object may be omitted from the plurality of estimated states associated with the set of estimated states. In such examples, the data may be omitted from estimated states corresponding to a reference action and associated sub-action of the action. In various examples, the data associated with the object may be omitted from subsequent estimated states (e.g., estimated states after the second time) associated with the reference action of the action and/or omitted from other vehicle control planning operations. For example, based on a determination in a estimated state associated with a lane change to the left that the object is no longer relevant at a particular time, the vehicle computing device may remove data associated with the object from estimated states associated with multiple sets of estimated states that correspond to the lane change to the left after the particular time.

Figure 6:
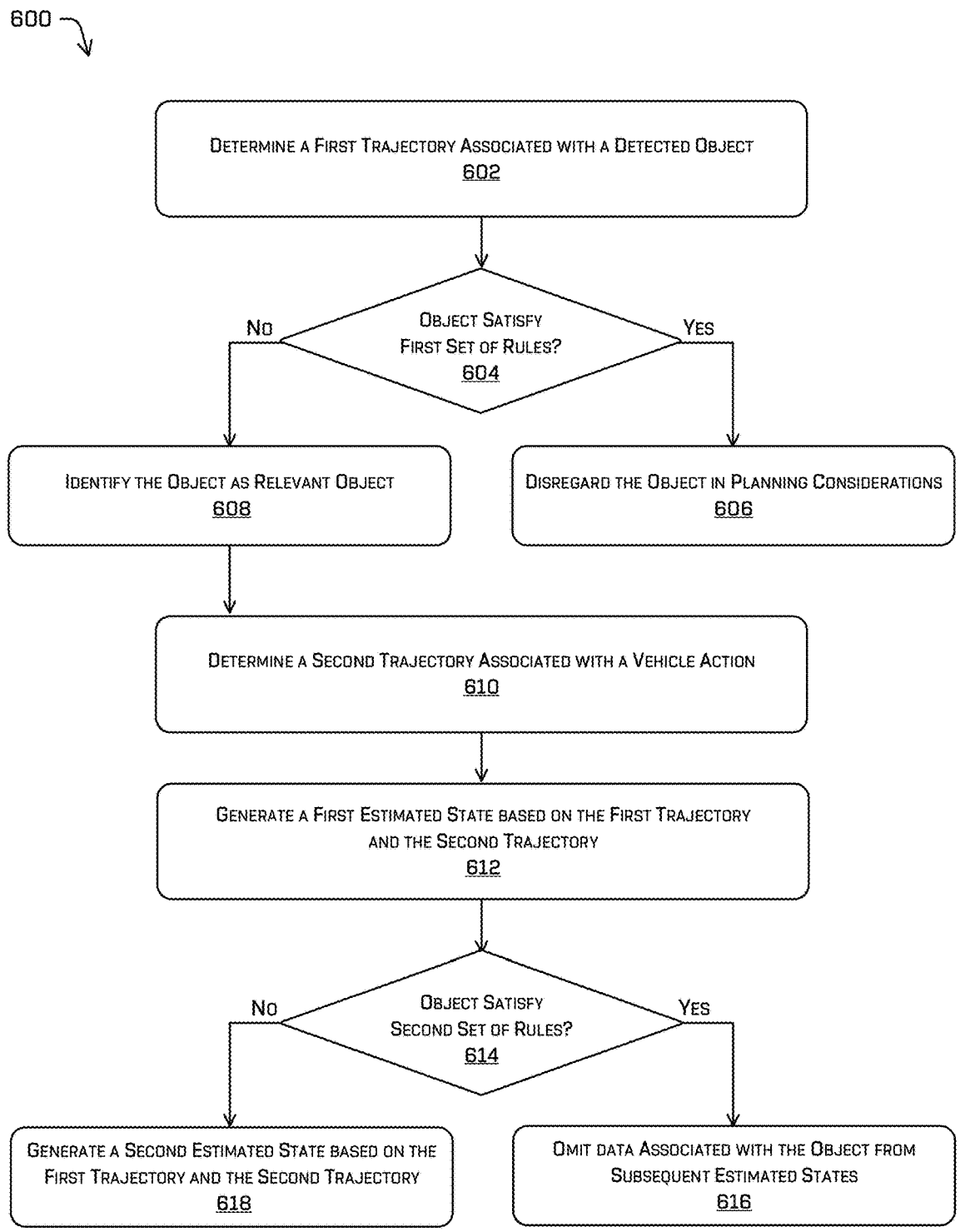
FIG. 6 depicts an example process for determining an initial relevance of an object to a vehicle and verifying the relevance of the object during a set of estimated states.

FIG. 6 depicts an example process 600 for determining an initial relevance of an object in an environment and verifying the relevance during a set of estimated states. Some or all of the process 600 may be performed by one or more components in FIG. 3, as described herein. For example, some or all of the process 600 may be performed by the vehicle computing device 304.

At operation 602, the process may include determining a first trajectory associated with a detected object in the environment. The first trajectory may include a predicted trajectory of the object while operating in the environment. The first trajectory may represent a potential path the object may take through the environment. The vehicle computing system may be configured to detect an object and determine the first trajectory thereof based on sensor data received from one or more sensors on the vehicle and/or from one or more remote sensors. In some examples, the first trajectories may be determined based on an assumption of the object maintaining a substantially constant velocity and/or direction of travel. In some examples, the first trajectories may be determined utilizing one or more heat maps. In various examples, the first trajectories may be determined utilizing machine learning techniques. In various examples, the first trajectories may be based on learned predictability of the object, such as based on a classification thereof.

At operation 604, the process may include determining whether the object satisfies a first set of rules. In various examples, the first set of rules may correspond to an initial relevance determination. In such examples, the first set of rules may represent a conservative set of rules to ensure that if satisfied, the object and the vehicle will not occupy the same space over a time period (e.g., within a threshold distance of a path of the vehicle). The first set of rules may include relative distances (e.g., threshold distance from vehicle), relative locations (e.g., in front, behind, etc.), speeds, and/or directions of travel between the vehicle and the relevant object. In some examples, the first set of rules may be based on a classification associated with the relevant object.

Based on a determination that the object satisfies the first set of rules ("Yes" at operation 604), the process, at operation 606, may include disregarding the object in planning considerations (e.g., omitting data from future estimated states). The planning considerations may include determining an action for the vehicle to take in the environment. In various examples, the vehicle computing device may determine the action based on results associated with one or more estimated states. The estimated state(s) may include estimated positions of the vehicle throughout the time period, such as at periodic intervals, based on an initial position of the vehicle and the action and/or trajectory associated therewith. Disregarding the object in the planning considerations includes omitting data associated with the object from the estimated state(s).

Based on a determination that the object does not satisfy the first set of rules ("No" at operation 604), the process, at operation 608, may include identifying the object as a relevant object to the vehicle. The object may be relevant to the vehicle based on a determination that the object and the vehicle could occupy the same space over the time period.

At operation 610, the process may include determining a second trajectory associated with a vehicle action. As discussed above, the vehicle action may include a reference action and/or sub-action that the vehicle could take in the environment. The second trajectory may include one or more directions of travel and/or one or more velocities and/or accelerations associated with the action. In some examples, the second trajectory may be based at least in part on data associated with a planned route of the vehicle through the environment.

At operation 612, the process may include generating a first estimated state based on the first trajectory and the second trajectory. The first estimated state may include an estimated position of the vehicle and an estimated position of the object at a first time of a time period. In some examples, the first estimated state may be one of a plurality of estimated states comprising estimated positions of the vehicle and object at corresponding times throughout the time period. In at least one example, the estimated states may be periodically generated by the vehicle computing device throughout the time period.

At operation 614, the process may include determining whether the object satisfies a second set of rules. The second set of rules may be the same as the first set of rules. In some examples, the second set of rules may be different from the first set of rules. In such examples, the relative distances, locations, and/or trajectories may differ from the first set of rules to the second set of rules. For example, the first set of rules may include a first threshold distance of 30 feet between the vehicle and an object based on the object being located behind the vehicle. The second set of rules may include a second threshold distance of 28 feet between the vehicle and the object based on the object being located behind the vehicle. In various examples, the differences between the first set of rules and the second set of rules may be based on a confidence level in a position associated with the vehicle and/or the relevant object. In such examples, as a level of confidence in estimated positions of the vehicle and the object decreases, threshold distances may increase, and vice versa.

Based on a determination that the object satisfies the second set of rules ("Yes" at operation 614), the process, at operation 616, may include omitting data associated with the object from subsequent estimated states associated with the vehicle action and/or other vehicle control planning operations. In some examples, the data associated with the object may be omitted from a set of estimated states corresponding to the first estimated state. In such examples, the data may be omitted from estimated states corresponding to the reference action and associated sub-action of the vehicle action. In various examples, the data associated with the object may be omitted from subsequent estimated states (e.g., estimated states after the second time) associated with the reference action of the action and/or other vehicle control planning operations. For example, based on a determination in an estimated state associated with a lane change to the left that the object is no longer relevant at a particular time, the vehicle computing device may remove data associated with the object from estimated states associated with multiple sets of estimated states that correspond to the lane change to the left after the particular time.

Based on a determination that the object does not satisfy the second set of rules ("No" at operation 614), the process, at operation 618, may include generating a second estimated state based on the first trajectory and the second trajectory. The second estimated state may include estimated positions of the object and the vehicle corresponding to a second time of the time period.

Figure 7:
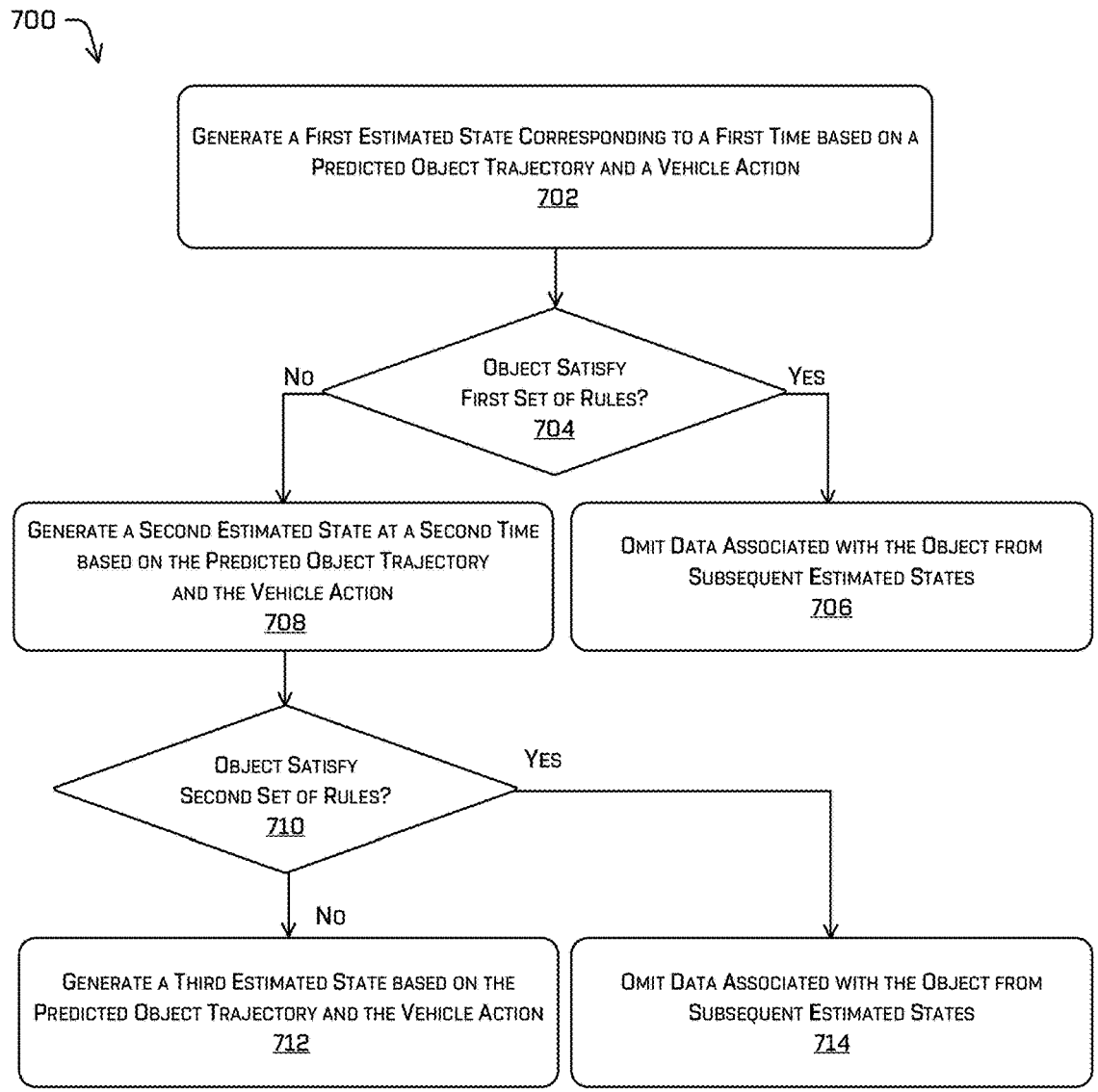
FIG. 7 depicts an example process for determining relevance of an object at a first time utilizing a first set of rules and at a second time utilizing a second set of rules.

FIG. 7 depicts an example process 700 for verifying relevance of an object at a first time utilizing a first set of rules and at a second time utilizing a second set of rules, in accordance with embodiments of the disclosure. Some or all of the process 700 may be performed by one or more components in FIG. 3, as described herein. For example, some or all of the process 700 may be performed by the vehicle computing device 304.

At operation 702, the process may include generating a first estimated state corresponding to a first time based on a predicted object trajectory and a vehicle action. As discussed above, the predicted object trajectory may be determined based on sensor data received from one or more sensors of a vehicle and/or one or more remote sensors. The predicted object trajectory may represent a potential path the object may take through the environment. As discussed above, the predicted object trajectory may be determined using a substantially constant velocity and/or direction of travel, machine learning techniques, heat maps, predictability of objects based on a classification, or the like. In various examples, the first estimated state may be based on a vehicle trajectory associated with the vehicle action (e.g., reference action and/or sub-action). The estimated state may include an estimated position of the vehicle and an estimated position of the object at the first time. In some examples, the first time may correspond to an initial time (e.g., current time) of a set of estimated states. In such examples, the first estimated state may be a first of a plurality of estimated states throughout a time period. In some examples, the first estimated state may represent a estimated state associated with a first relevance verification of a set of estimated states.

At operation 704, the process may include determining whether the object satisfies a first set of rules. As discussed above, the first set of rules may include relative distances (e.g., threshold distance from vehicle), relative locations (e.g., in front, behind, etc.), velocities, and/or directions of travel between the vehicle and the object. In some examples, the first set of rules may be based on a classification associated with the object. In some examples, the first set of rules may correspond to an initial relevance determination. In such examples, the first set of rules may represent a conservative set of rules to ensure that if satisfied, the object and the vehicle will not occupy the same space over a time period.

Based on a determination that the object satisfies the first set of rules ("Yes" at operation 704), the process, at operation 706, may include omitting data associated with the object from subsequent estimated states and/or other vehicle control planning operations. In some examples, the data associated with the object may be omitted from a plurality of estimated states associated with a set of estimated states. In such examples, the data may be omitted from estimated states corresponding to a reference action and associated sub-action of the vehicle action. In various examples, the data associated with the object may be omitted from subsequent estimated states (e.g., estimated states after the second time) associated with the reference action of the vehicle action and/or other vehicle control planning operations. For example, based on a determination in an estimated state associated with a vehicle staying in a lane that the object is no longer relevant at a particular time, the vehicle computing device may remove data associated with the object from estimated states associated with multiple sets of estimated states that correspond to the vehicle staying in the lane after the particular time, such as staying in the lane and increasing velocity, staying in the lane and maintaining a substantially constant velocity, or the like.

Based on a determination that the object does not satisfy the first set of rules ("No" at operation 704), the process, at operation 708, may include generating a second estimated state corresponding to a second time based on the predicted object trajectory and the vehicle action. The second estimated state may include estimated positions of the object and the vehicle corresponding to a second time of the time period.

At operation 710, the process may include determining whether the object satisfies a second set of rules. In various examples, the second set of rules may be substantially the same as the first set of rules. In some examples, the second set of rules may be different from the first set of rules. In such examples, the second set of rules may include different values associated with threshold distances (and associated positions, directions of travel, etc.), velocities, etc. between the vehicle and the object. In various examples, the values may be greater based at least in part on a lack of confidence associated with the estimated positions associated with the second estimated state as compared to the estimated positions associated with the first estimated state. Although illustrated as concurrent estimated states (e.g., first estimated state, second estimated state, etc.), the vehicle computing device may generate one or more additional estimated states between the illustrated first and second estimated states. As discussed above, the vehicle computing device may perform object relevance verifications, such as those performed at operation 704 and operation 710, periodically (e.g., at set intervals such as every 3 seconds, 4 seconds, etc.) and/or randomly throughout a set of estimated states (e.g., time period).

Based on a determination that the object does not satisfy the first set of rules ("No" at operation 710), the process, at operation 712, may include generating a third estimated state corresponding to a third time based on the predicted object trajectory and the vehicle action. The third estimated state may include estimated positions of the object and the vehicle corresponding to the third time of the time period.

Based on a determination that the object satisfies the first set of rules ("Yes" at operation 710), the process, at operation 714, may include omitting data associated with the object from subsequent estimated states and/or other vehicle control planning operations. As discussed above, the data associated with the object may be omitted from subsequent estimated states associated with the reference action and/or sub-action associated with the vehicle action. Additionally, as discussed above, omitting data associated with the object from subsequent estimated states may increase an amount of processing power and/or memory available to the vehicle computing device.

Accordingly, the techniques discussed herein may improve the functioning of the vehicle computing device.

EXAMPLE CLAUSES

A: A vehicle comprising: one or more sensors: one or more processors; and memory storing computer-executable instructions that, when executed by the one or more processors, configure the vehicle to: receive sensor data from the one or more sensors: identify a first object and a second object in an environment based at least in part on the sensor data: determine a first trajectory associated with the first object and a second trajectory associated with the second object: determine an action for the vehicle: determine first estimated positions of the vehicle, the first object, and the second object at a first time after a current time, the first estimated positions being based at least in part on the action, the first trajectory, and the second trajectory: determine, based at least in part on the first estimated positions and one or more rules, that the action is independent of the first object: determine second estimated positions of the vehicle, the first object, and the second object at a second time after the current time, the second estimated positions being based at least in part on the action, the first trajectory, and the second trajectory: determine, based at least in part on the second estimated positions and that the action is independent of the first object, whether the vehicle safely performs the action; and control operation of the vehicle to perform the action.

B: A vehicle as paragraph A describes, wherein the instructions further configure the vehicle to: determine a first classification associated with the first object and a second classification associated with the second object, wherein determining that the action is independent of the first object irrelevant is based at least in part on the first classification associated with the first object.

C: A vehicle as either of paragraphs A or B describe, wherein the instructions further configure the vehicle to: identify a third object located at an initial position in the environment: determine a classification associated with the third object; determine a third trajectory associated with the third object: determine, based on at least one of the initial position, the classification, or the third trajectory, that the third object is irrelevant to the vehicle performing the action; and disregarding data associated with the third object from a first estimated state comprising the first estimated positions, a second estimated state comprising the second estimated positions.

D: A vehicle as any one of paragraphs A-C describe, wherein the one or more rules comprise at least one of: a first distance between the first estimated position of the vehicle and the first estimated position of the first object meets or exceeds a first threshold distance: a second distance between the second estimated position of the vehicle and a second estimated position of the second object meets or exceeds a second threshold distance: the first object is behind the vehicle: a first direction of travel corresponding to the first object, the first direction of travel being relative to a vehicle trajectory: a second direction of travel corresponding to the second object, the second direction of travel being relative to the vehicle trajectory: an absolute position in a map; an environmental factor: a weather factor: or a timing factor.

E: A vehicle as any one of paragraphs A-D describe, wherein the one or more rules are applied periodically or dynamically throughout a plurality of estimated states including a first estimated state comprising the first estimated positions, a second estimated state comprising the second estimated positions.

F: A method comprising: identifying an object in an environment in which a vehicle operates: determining a trajectory associated with the object: determining an action for the vehicle to take in the environment: determining a first estimated vehicle position and a first estimated object position at a first time: determining a second estimated vehicle position and a second estimated object position at a second time; determining that the object is irrelevant at the second time based at least in part on one or more rules; and based at least in part on determining that the object is irrelevant, determining a third estimated vehicle position at the exclusion of the object.

G: A method as paragraph F describes, further comprising: determining an initial position associated with the object; and determining, based on at least one of the initial position or the trajectory, that the object is relevant to the vehicle at an initial time, wherein including the object in a first estimated state comprising the first estimated vehicle position and the first estimated object position, and a second estimated state comprising the second estimated vehicle position and the second estimated object position, is based at least in part on determining that the object is relevant to the vehicle at the initial time.

H: A method as either of paragraphs F or G describe, further comprising: receiving sensor data; and determining, based at least in part on the sensor data, a classification associated with the object, wherein the determining that the object is irrelevant is further based on the classification.

I: A method as any one of paragraphs F-H describe, wherein the object is a first object, the method further comprising: identifying a second object in the environment: determining an initial position associated with the second object; determining a second trajectory associated with the second object: determining, based on at least one of the initial position or the second trajectory, that the second object is irrelevant to the vehicle performing the action at an initial time; and disregarding data associated with the second object from the first estimated vehicle position and the second estimated vehicle position based on determining that the second object is irrelevant to the vehicle performing the action.

J: A method as any one of paragraphs F-I describe, wherein the one or more rules comprise at least one of: determining whether a distance between the second estimated vehicle position and a second estimated object position meets or exceeds a threshold distance: or a location of the second estimated object position relative to the second estimated vehicle position is one or more of abeam or behind the vehicle.

K: A method as any one of paragraphs F-J describe, wherein the object is a first object and wherein determining that the first object is irrelevant to the vehicle performing the action at the second time is based at least in part on a first distance between the second estimated vehicle position and the second estimated object position of the first object being equal to or greater than a first threshold distance, the method further comprising: identifying a second object in the environment: determining a second trajectory associated with the second object: determining a third estimated object position of the second object at the first time: determining a fourth estimated object position of the second object at the second time; and determining a third estimated vehicle position and a third estimated object position of the second object at a third time after the second time.

L: A method as paragraph K describes, further comprising: determining, based at least in part on the third estimated vehicle position at the third time, the fourth estimated object position, and independent of the first object, whether the vehicle is able to perform the action; and controlling the vehicle to perform the action.

M: A method as any one of paragraphs F-L describe, wherein the action comprises a maneuver of a predetermined group of maneuvers the vehicle is configured to perform in the environment and at least one of a velocity variation or a positional variation.

N: A system or device comprising: a processor; and a non-transitory computer-readable medium storing instructions that, when executed, cause processor to perform a computer-implemented method as any one of paragraphs F-L describe.

O: A system or device comprising: a means for processing; and a means for storing coupled to the means for processing, the means for storing including instructions to configure one or more devices to perform a computer-implemented method as any one of paragraphs F-L describe.

P: A non-transitory computer-readable medium storing instructions that, when executed, cause one or more processors to perform operations comprising: determining a trajectory associated with an object detected in an environment; determining an action for a vehicle to take in the environment: determining a first estimated vehicle position and a first estimated object position at a first time after a current time: determining a second estimated vehicle position and a second estimated object position at a second time after the current time: determining that the object is irrelevant to the vehicle performing the action at the second time based at least in part on a set of rules; and based at least in part on determining that the object is irrelevant, determining a third estimated vehicle position at a third time after the current time, the third estimated vehicle position being independent of the object.

Q: A non-transitory computer-readable medium as paragraph P describes, the operations further comprising: determining an initial position associated with the object at the current time; and determining, based on at least one of the initial position or the trajectory, that the object is relevant to the vehicle at the current time, wherein determining the first estimated vehicle position is based at least in part on the initial position or trajectory and determining that the object is relevant to the vehicle at the current time.

R: A non-transitory computer-readable medium as either of paragraphs P or Q describe, the operations further comprising: identifying a second object in the environment: determining an initial position associated with the second object; determining a second trajectory associated with the second object; and determining, based on at least one of the initial position or the second trajectory, that the second object is irrelevant to the vehicle at the current time, wherein the first estimated vehicle position is independent of the second object.

S: A non-transitory computer-readable medium as any one of paragraphs P-R describe, the operations further comprising: receiving sensor data; and determining, based at least in part on the sensor data, a classification associated with the object, wherein the determining that the object is irrelevant is based at least in part on the classification.

T: A non-transitory computer-readable medium as any one of paragraphs P-S describe, wherein the set of rules comprise at least one of: a distance between the second estimated vehicle position and a second estimated object position meets or exceeds a threshold distance: or a location of the second estimated object position relative to the second estimated vehicle position is behind the second estimated vehicle position.

U: A non-transitory computer-readable medium as any one of paragraphs P-T describe, wherein the object is a first object and wherein determining that the first object is irrelevant to the vehicle at the second time is based at least in part on a first distance between the second estimated vehicle position and the second estimated object position of the first object being equal to or greater than a first threshold distance, the operations further comprising: identifying a second object in the environment: determining a second trajectory associated with the second object: determining a third estimated object position of the second object at the first time: determining a fourth estimated object position of the second object at the second time: determining a third estimated object position associated with the second object at the third time; and determining that the second object is irrelevant to the vehicle performing the action at the third time based at least in part on a second distance between the third estimated vehicle position and a third estimated object position being equal to or greater than a second threshold distance, the second threshold distance being greater than the first threshold distance.

V: A non-transitory computer-readable medium as paragraph U describes, the operations further comprising: determining, based at least in part on the third estimated vehicle position at the third time, the fourth estimated object position, and independent of the first object, whether the vehicle is able to perform the action; and controlling the vehicle to perform the action.

W: A vehicle comprising: a processor; and a non-transitory computer-readable medium as any one of paragraphs P-U describe coupled to the processor.

X: A system comprising: a processor; and a non-transitory computer-readable medium as any one of paragraphs P-U describe coupled to the processor.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   one or more sensors;
   one or more processors; and
   memory storing processor-executable instructions that, when executed by the one or more processors, configure the vehicle to:
   receive sensor data from the one or more sensors;
   identify a first object and a second object in an environment based at least in part on the sensor data;
   determine a first trajectory associated with the first object and a second trajectory associated with the second object;
   determine an action for the vehicle, wherein the action is a maneuver to be performed autonomously by the vehicle;
   determine first estimated positions of the vehicle, the first object, and the second object at a first time after a current time, the first estimated positions being based at least in part on the action as previously determined, the first trajectory, and the second trajectory, wherein the first estimated positions comprise a first position associated with the first object at the first time and a second position associated with the second object at the first time;
   determine, using a machine learning model trained to output a set of threshold conditions for relevance determination with respect to the vehicle performing the maneuver based on inputs associated with observed objects, and as an output of the machine learning model, one or more threshold conditions;
   determine, based at least in part on the one or more threshold conditions, one or more rules for determining whether at least one of the first object or the second object is relevant to the vehicle performing the maneuver;
   determine, based at least in part on the first position and the one or more rules, that the action is independent of the first object at the first time;
   determine, based at least in part on the second position and the one or more rules, that the action is related to the second object at the first time;
   based at least in part on determining that the action is related to the second object at the first time, determine second estimated positions of the vehicle and the second object at a second time after the current time, the second estimated positions being based at least in part on the action as previously determined and the second trajectory, wherein the second estimated positions comprise a third position associated with the second object at the second time;
   determine, based at least in part on the third position and the one or more rules, that the action is independent of the second object at the second time;
   based on determining that the action is related to the second object at the first time and independent of the second object at the second time, determine, based at least in part on the second estimated positions, that the vehicle can safely perform the action; and
   control operation of the vehicle to perform the action.

2. The vehicle as claim 1 recites, wherein the instructions further configure the vehicle to:
   determine a first classification associated with the first object and a second classification associated with the second object,
   wherein determining that the action is independent of the first object is based at least in part on the first classification associated with the first object.

3. The vehicle as claim 1 recites, wherein the instructions further configure the vehicle to:
   identify a third object located at an initial position in the environment;
   determine a classification associated with the third object;
   determine a third trajectory associated with the third object;
   determine, based on at least one of the initial position, the classification, or the third trajectory, that the third object is irrelevant to the vehicle performing the action; and
   disregarding data associated with the third object from a first estimated state comprising the first estimated positions, a second estimated state comprising the second estimated positions.

4. The vehicle as claim 1 recites, wherein the one or more rules comprise at least one of:
   a first distance between the first estimated position of the vehicle and the first estimated position of the first object meets or exceeds a first threshold distance;
   a second distance between the second estimated position of the vehicle and the second estimated position of the second object meets or exceeds a second threshold distance;
   the first object is behind the vehicle;
   a first direction of travel corresponding to the first object, the first direction of travel being relative to a vehicle trajectory;

a second direction of travel corresponding to the second object, the second direction of travel being relative to the vehicle trajectory;
an absolute position in a map;
an environmental factor;
a weather factor; or
a timing factor.

5. The vehicle as claim 1 recites, wherein the one or more rules are applied periodically or dynamically throughout a plurality of estimated states including the first estimated state comprising the first estimated positions, the second estimated state comprising the second estimated positions.

6. A method performed at least in part by one or more processors of a computing device, the method comprising:
   identifying, an object in an environment in which a vehicle operates;
   determining, a trajectory associated with the object;
   determining, an action for the vehicle to take in the environment, wherein the action comprises a maneuver to be performed autonomously by the vehicle;
   determining, a first estimated vehicle position and a first estimated object position at a first time;
   determining, a second estimated vehicle position and a second estimated object position at a second time;
   receiving a first set of rules for determining whether the object is relevant to the vehicle performing the maneuver at the first time, the first set of rules determined based on a first set of threshold conditions for relevance determination with respect to the vehicle performing the maneuver at the first time;
   determining, based at least in part on the first set of rules, that the object is relevant to the vehicle performing the maneuver at the first time;
   receiving a second set of rules for determining whether the object is relevant to the vehicle performing the maneuver at the second time, the second set of rules determined based at least in part on a second set of threshold conditions for relevance determination with respect to the vehicle performing the maneuver at the second time, wherein the second set of threshold conditions is determined as an output of a machine learning model and based at least in part on one or more of:
   a state of the object relative to the vehicle,
   an environmental factor,
   a weather factor, or
   timing factors;
   based at least in part on determining that the object is relevant to the vehicle performing the maneuver at the first time, determining, based at least in part on the second set of rules, that the object is irrelevant to the vehicle performing the maneuver at the second time;
   based at least in part on determining that the object is irrelevant, determining, a third estimated vehicle position at the exclusion of the object; and
   controlling the vehicle based at least in part on the third estimated vehicle position.

7. The method as claim 6 recites, further comprising:
   receiving sensor data; and
   determining, based at least in part on the sensor data, a classification associated with the object,
   wherein the determining that the object is irrelevant is further based on the classification.

8. The method as claim 6 recites, wherein the object is a first object, the method further comprising:
   identifying a second object in the environment;
   determining an initial position associated with the second object;
   determining a second trajectory associated with the second object;
   determining, based on at least one of the initial position or the second trajectory, that the second object is irrelevant to the vehicle performing the action at an initial time; and
   disregarding data associated with the second object from the first estimated vehicle position and the second estimated vehicle position based on determining that the second object is irrelevant to the vehicle performing the action.

9. The method as claim 6 recites, wherein the second set of rules comprises at least one of:
   determining whether a distance between the second estimated vehicle position and the second estimated object position meets or exceeds a threshold distance; or
   a location of the second estimated object position relative to the second estimated vehicle position is one or more of abeam or behind the vehicle.

10. The method as claim 6 recites, wherein the object is a first object and wherein determining that the first object is irrelevant to the vehicle performing the action at the second time is based at least in part on a first distance between the second estimated vehicle position and the second estimated object position of the first object being equal to or greater than a first threshold distance, the method further comprising:
    identifying the second object in the environment;
    determining the second trajectory associated with the second object;
    determining a third estimated object position of the second object at the first time;
    determining a fourth estimated object position of the second object at the second time; and
    determining a fourth estimated vehicle position and a fifth estimated object position of the second object at a third time after the second time.

11. The method as claim 10 recites, further comprising:
    determining, based at least in part on the fourth estimated vehicle position at the third time, the fifth estimated object position, and independent of the first object, that the vehicle is able to safely perform the action, wherein controlling the vehicle is further based on a determination that the vehicle is able to safely perform the action.

12. The method as claim 6 recites, wherein the maneuver comprises one of a predetermined group of maneuvers the vehicle is configured to perform in the environment, the maneuver comprising at least one of a velocity variation or a positional variation of the vehicle.

13. A non-transitory computer-readable medium storing instructions that, when executed, cause one or more processors to perform operations comprising:
    determining a trajectory associated with an object detected in an environment;
    determining an action for a vehicle to take in the environment, wherein the action comprises a maneuver to be performed autonomously by the vehicle;
    determining a first estimated vehicle position and a first estimated object position at a first time after a current time;
    determining a second estimated vehicle position and a second estimated object position at a second time after the current time;

receiving a first set of rules for determining whether the object is relevant to the vehicle performing the maneuver at the first time, the first set of rules determined based on a first set of threshold conditions for relevance determination with respect to the vehicle performing the maneuver at the first time;

determining, based at least in part on the first set of rules, that the object is relevant to the vehicle performing the maneuver at the first time;

receiving a second set of rules for determining whether the object is relevant to the vehicle performing the maneuver at the second time, the second set of rules determined based at least in part on a second set of threshold conditions for relevance determination with respect to the vehicle performing the maneuver at the second time, wherein the second set of threshold conditions is determined as an output of a machine learning model and based at least in part on one or more of:
a state of the object relative to the vehicle,
an environmental factor,
a weather factor, or
timing factors;

based at least in part on determining that the object is relevant to the vehicle performing the maneuver at the first time, determining, based at least in part on the second set of rules, that the object is irrelevant to the vehicle performing the maneuver at the second time;

based at least in part on determining that the object is irrelevant, determining a third estimated vehicle position at a third time after the current time, the third estimated vehicle position being independent of the object; and controlling the vehicle based at least in part on the third estimated vehicle position.

14. The non-transitory computer-readable medium of claim 13, the operations further comprising:
determining an initial position associated with the object at the current time; and
determining, based on at least one of the initial position or the trajectory, that the object is relevant to the vehicle at the current time,
wherein determining the first estimated vehicle position is based at least in part on the initial position or the trajectory and determining that the object is relevant to the vehicle at the current time.

15. The non-transitory computer-readable medium of claim 13, the operations further comprising:
identifying a second object in the environment;
determining an initial position associated with the second object;
determining a second trajectory associated with the second object; and
determining, based on at least one of the initial position or the second trajectory, that the second object is irrelevant to the vehicle at the current time, wherein the first estimated vehicle position is independent of the second object.

16. The non-transitory computer-readable medium of claim 13, the operations further comprising:
receiving sensor data; and
determining, based at least in part on the sensor data, a classification associated with the object,
wherein the determining that the object is irrelevant is based at least in part on the classification.

17. The non-transitory computer-readable medium of claim 13, wherein the set second of rules comprise at least one of:
a distance between the second estimated vehicle position and the second estimated object position meets or exceeds a threshold distance; or
a location of the second estimated object position relative to the second estimated vehicle position is behind the second estimated vehicle position.

18. The non-transitory computer-readable medium of claim 13, wherein the object is a first object and wherein determining that the first object is irrelevant to the vehicle at the second time is based at least in part on a first distance between the second estimated vehicle position and the second estimated object position of the first object being equal to or greater than a first threshold distance, the operations further comprising:
identifying the second object in the environment;
determining the second trajectory associated with the second object;
determining a third estimated object position of the second object at the first time;
determining a fourth estimated object position of the second object at the second time;
determining a fifth estimated object position associated with the second object at the third time; and
determining that the second object is irrelevant to the vehicle performing the action at the third time based at least in part on a second distance between the third estimated vehicle position and the fifth estimated object position being equal to or greater than a second threshold distance, the second threshold distance being greater than the first threshold distance.

19. The non-transitory computer-readable medium of claim 18, the operations further comprising:
determining, based at least in part on the third estimated vehicle position at the third time, the fourth estimated object position, and independent of the first object, that the vehicle is able to safely perform the action,
wherein controlling the vehicle is further based on a determination that the vehicle is able to safely perform the action.

20. The method of claim 6, further comprising:
determining a class of the object describing a type, size, or characteristic of the object, and wherein the second set of rules are determined by inputting the class of the object into the machine learning model and receiving, from the machine learning model, the second set of rules.

* * * * *